United States Patent
Di Noto et al.

(10) Patent No.: US 10,811,691 B2
(45) Date of Patent: Oct. 20, 2020

(54) ELECTROCATALYSTS ON CARBONITRIDE MATRICES

(71) Applicant: BRETON S.P.A., Castello di Godego (IT)

(72) Inventors: Vito Di Noto, Cadoneghe (IT); Enrico Negro, Camposampiero (IT); Keti Vezzu', Rovolon (IT); Federico Bertasi, Bardolino (IT); Graeme Nawn, Treviso (IT); Luca Toncelli, Bassano del Grappa (IT); Stefano Zeggio, Castagnole di Paese (IT); Fabio Bassetto, Creazzo (IT)

(73) Assignee: BRETON S.P.A., Castello di Godego (TV) (IT)

( * ) Notice: Subject to any disclaimer, the term of this patent is extended or adjusted under 35 U.S.C. 154(b) by 0 days.

(21) Appl. No.: 15/760,358

(22) PCT Filed: Sep. 26, 2016

(86) PCT No.: PCT/IB2016/055728
§ 371 (c)(1),
(2) Date: Mar. 15, 2018

(87) PCT Pub. No.: WO2017/055981
PCT Pub. Date: Apr. 6, 2017

(65) Prior Publication Data
US 2018/0254488 A1 Sep. 6, 2018

(30) Foreign Application Priority Data
Sep. 28, 2015 (IT) .......................... 102015000055603

(51) Int. Cl.
*H01M 4/86* (2006.01)
*H01M 4/90* (2006.01)
(Continued)

(52) U.S. Cl.
CPC .......... *H01M 4/8652* (2013.01); *B01J 21/18* (2013.01); *B01J 37/04* (2013.01); *B01J 37/08* (2013.01);
(Continued)

(58) Field of Classification Search
CPC .. H01M 4/8652; H01M 4/921; H01M 4/9041; H01M 4/925; B01J 21/18; B01J 37/04; B01J 37/08; B01J 37/348
See application file for complete search history.

(56) References Cited

U.S. PATENT DOCUMENTS 5,316,990 A * 5/1994 Cooper ................... B01J 21/18
502/5
7,687,428 B1 * 3/2010 Zhong ................... B01J 23/002
429/218.1
(Continued)

FOREIGN PATENT DOCUMENTS

CN 103241763 A 8/2013
EP 2014728 A1 1/2009
(Continued)

OTHER PUBLICATIONS

English Abstract and Machine Translation for Chinese Publication No. 103241763 A, published Aug. 14, 2013, 10 pgs.
(Continued)

*Primary Examiner* — Jun Li
(74) *Attorney, Agent, or Firm* — Fredrikson & Byron, P.A.

(57) ABSTRACT

The invention relates to electrocatalysts comprising a carbonitride (CN) shell featuring good electrical conductivity, coordinating suitable catalytically active sites. In a preferred aspect of the invention, the aforesaid carbonitride shell coordinates nanoparticles or aggregates of nanoparticles, on which the active sites of the electrocatalyst are located. In a
(Continued)

Typical structure of an electrocatalyst according to the present invention preferred form of the invention, said carbonitride shell covers suitable cores with good electrical conductivity. Said electrocatalysts are obtained through a process involving the pyrolysis of suitable precursors; in one aspect of the invention, the preparation process requires certain further steps. In one preferred aspect, the steps comprise one or more of the following: chemical treatments; electrochemical treatments; further pyrolysis processes.

24 Claims, 10 Drawing Sheets

(51) Int. Cl.
*H01M 4/92* (2006.01)
*B01J 21/18* (2006.01)
*B01J 37/34* (2006.01)
*B01J 37/08* (2006.01)
*B01J 37/04* (2006.01)
B82Y 30/00 (2011.01)
B82Y 40/00 (2011.01)

(52) U.S. Cl.
CPC ......... *B01J 37/348* (2013.01); *H01M 4/8673* (2013.01); *H01M 4/9041* (2013.01); *H01M 4/9075* (2013.01); *H01M 4/9083* (2013.01); *H01M 4/921* (2013.01); *H01M 4/925* (2013.01); *H01M 4/926* (2013.01); *B82Y 30/00* (2013.01); *B82Y 40/00* (2013.01); *Y10S 977/777* (2013.01); *Y10S 977/81* (2013.01); *Y10S 977/892* (2013.01); *Y10S 977/948* (2013.01)

(56) References Cited

U.S. PATENT DOCUMENTS

| | | | |
|---|---|---|---|
| 8,691,716 B2 | 4/2014 | Di Noto et al. | |
| 2006/0178260 A1* | 8/2006 | Zhong | B22F 9/24 502/185 |
| 2013/0089812 A1* | 4/2013 | Mukerjee | B82Y 30/00 429/524 |
| 2015/0343428 A1* | 12/2015 | Kim | B01J 35/026 502/185 |

FOREIGN PATENT DOCUMENTS

| | | |
|---|---|---|
| JP | 2013188644 A | 9/2013 |
| WO | 2007098432 A2 | 8/2007 |
| WO | 2009157033 A2 | 12/2009 |
| WO | 2014181873 A1 | 11/2014 |

OTHER PUBLICATIONS

Schmidt, T.J. et al., "Rotating thin-film method for supported catalysts," Handbook of Fuel Cells—Fundamentals, Technology and Applications, vol. 2, (2003), pp. 316-333.
Di Noto, V. et al., "New inorganic-organic proton conducting membranes based on Nafion(R) and [ZrO2].(SiO2)0.67] nanoparticles: Synthesis vibrational studies and conductivity," Journal of Power Sources, (Jul. 14, 2007), pp. 561-574.
Di Noto, V. et al., "Core-shell ORR nano-electrocatalysts based on a PtNi Carbon Nitride "Shell" and Cu NP Core," ECS Meeting Abstract #1499 (2014), 2 pgs.
Di Noto, V. et al., "Development of nano-electrocatalysts based on carbon nitride supports for the ORR processes in PEM fuel cells," Electrochimica Acta 55 (2010), pp. 7564-7574.
Gasteiger, H.A. et al., "Activity benchmarks and requirements for Pt, Pt-alloy, and non-PT oxygen reduction catalysts for PEMFCs," Applied Catalysis B: Environmental 56 (2005) pp. 9-35.
Maye, Mathew M. et al., "Manipulating core-shell reactivities for processing nanoparticle sizes and shapes," Journal of Materials Chemistry, vol. 10, No. 8, Jan. 10, 2000, pp. 1895-1901.
Maye, Mathew M. et al., "Gold based core shell nanoparticles as fuell cell catalysts," Prep. Pap. -Am. Doc., Div. Fuel Chem. 2003, vol. 48, No. 2, Oct. 1, 2003, p. 756.
Ramaswamy, N. et al., "Fundamental mechanistic understanding of electrocalaysis of oxygen reduction on Pt and Non-Pt surfaces: acid versus alkaline media," Adv. Phys. Chem. vol. 2012 (2012), Article ID#491604, 17 pgs.
Van Der Vliet, D. et al., "On the importance of correcting for the uncompensated Ohmic resistance in model experiments of the Oxygen Reduction Reaction," Journal of Electroanalytical Chemistry, 647 (2010), pp. 29-34.
Wang, J.X. et al., "Intrinsic kinetic equation for oxygen reduction reaction in acidic media: the double Tafel slope and fuel cell applications," Faraday Discuss. 140 (2008) pp. 347-362.
PCT International Search Report and Written Opinion dated Mar. 3, 2017 for Intl. App. No. PCT/IB2016/055728, from which the instant application is based, 13 pgs.

* cited by examiner

Typical structure of an electrocatalyst according to the present invention

Figure 2
Two typical preparation schemes for the hybrid inorganic-organic precursor.
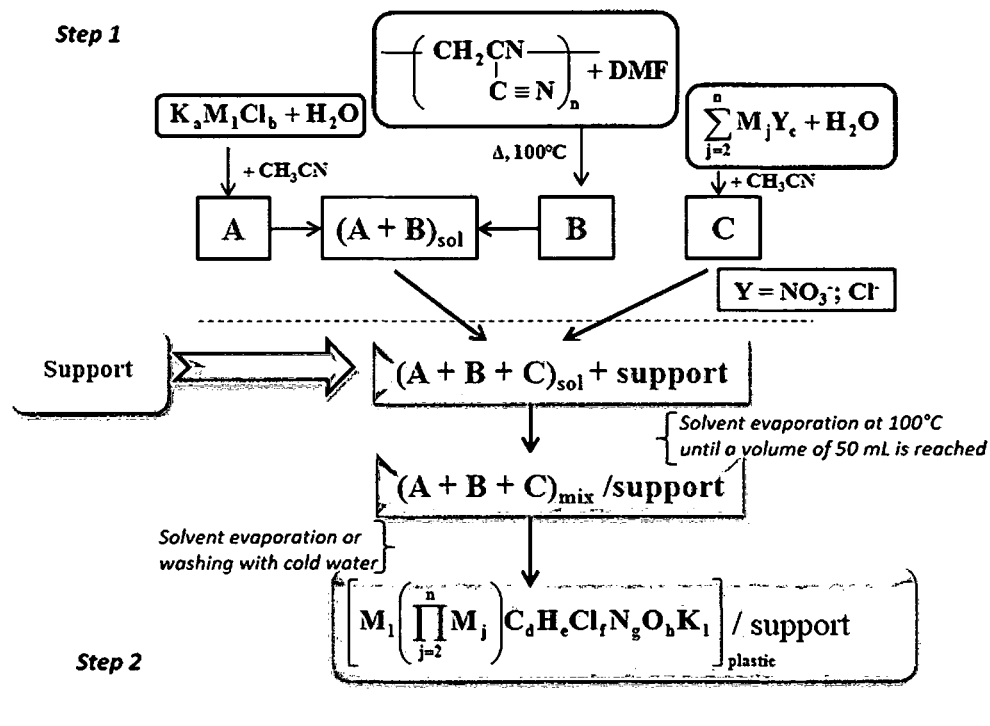
Ψ (Plastic HIO-PN precursor)/support
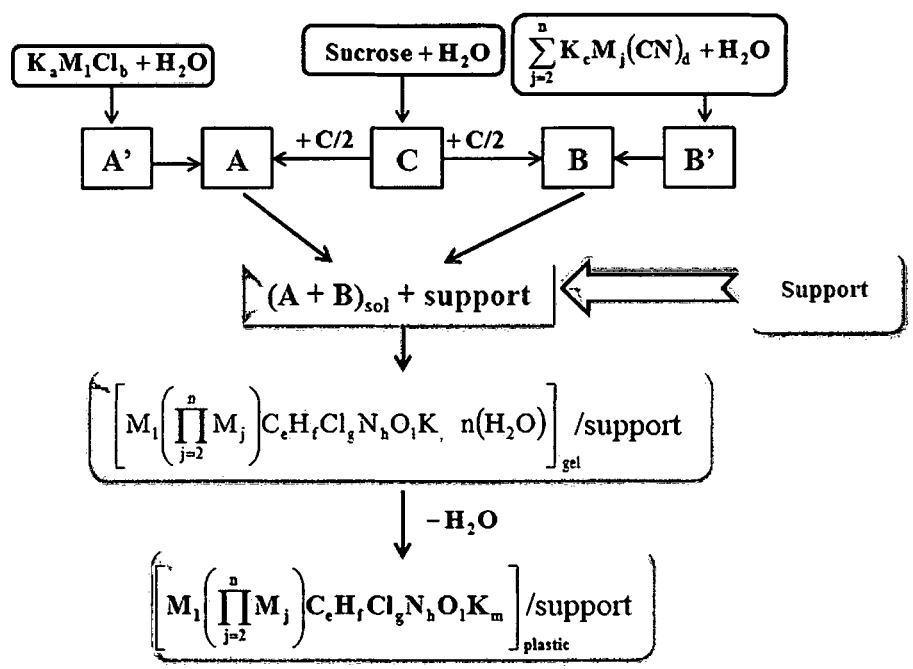
Φ (Plastic Z-IOPE precursor)/support Comparison of the electrochemical performance in the oxygen reduction reaction (ORR) of electrocatalysts deposited as layers on the rotating disc electrode (RDE); (a) RDE layer obtained as in Example 1; (b) RDE layers obtained as described in Example 2. Electrolyte: 0.1 M $HClO_4$ ; sweep rate: 20 mV $s^{-1}$; T=25°C; RDE rotation velocity = 1600 rpm.

Comparison of the ORR performance in the RDE layers. (a) and (b) RDE layers obtained as described in Example 3; (c) RDE layers obtained as described in Example 4. Electrolyte: 0.1 M $HClO_4$; sweep rate: 20 mV $s^{-1}$; T=25°C; RDE rotation velocity = 1600 rpm.

Comparison of the ORR performance in the RDE layers obtained as described in Example 5 and Example 6. *Sweep rate:* 20 mV s$^{-1}$; T=25°C; the RDE is rotated at 1600rpm. (a) Electrolyte: 0.1 M HClO$_4$ (b) Electrolyte: 0.1 M KOH.

Figure 6

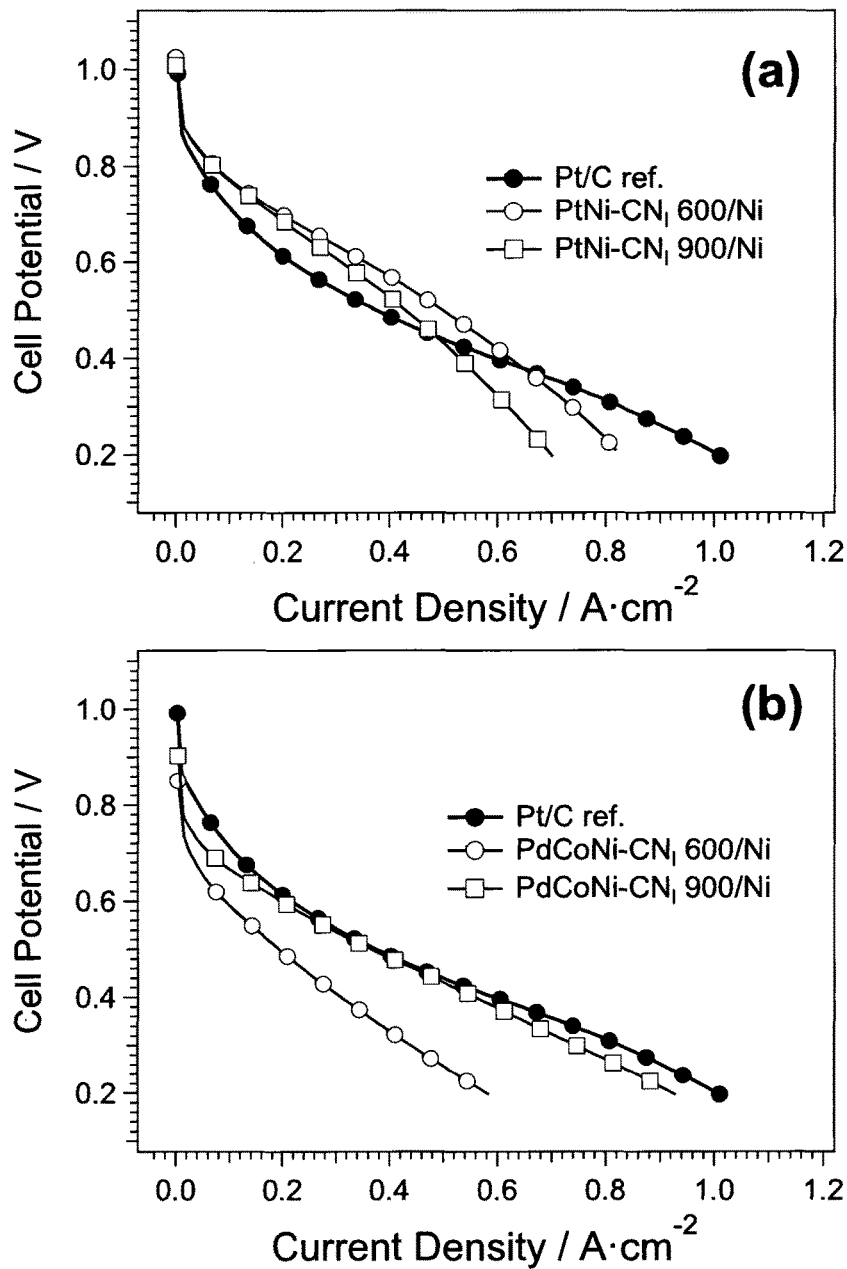

Comparison of the performance of a membrane electrode assembly (MEA) wherein the catalyst is deposited on the gas diffusion electrode (GDE). (a) MEA bearing GDEs obtained as described in Example 1; (b) MEA bearing GDEs obtained as described in Example 2. $H_2$ flow rate (anode): 800 mL per minute (sccm); $O_2$ flow rate (cathode) = 500 sccm; reagent flow temperature = 85°C; the reagent flows have a relative humidity of 100%; reagent flow pressure = 65 psig; cell temperature = 85 °C.

Comparison of the performance of the MEAs bearing the GDEs. (a) and (b) MEAs bearing GDEs obtained as described in Example 3; (c) MEA bearing GDEs obtained as described in Example 4. $H_2$ flow rate (anode) = 800 sccm; $O_2$ flow rate (cathode) = 500 sccm; reagent flow temperature = 85°C; the reagent flows have a relative humidity of 100%; reagent flow pressure = 65 psig; cell temperature = 85 °C.

Evolution of the morphology of PtNi-CN$_1$900/Ni following application of the electrochemical activation process as described in Example 1. (a) prior to the electrochemical activation process; (b) following the electrochemical activation process; (c) detailed view of the morphology following the electrochemical activation process.

Evolution of the morphology of PtNi-CN$_i$900/(Cu$_{50}$+C$_{50}$) following application of the electrochemical activation process as described in Example 3. (a) Prior to the electrochemical activation process; (b) following the electrochemical activation process; (c) detailed view of the morphology following the electrochemical activation process.

Evolution of the morphology of ECPtNi-CN$_h$ 900/(Cu$_{50}$) following application of the electrochemical activation process as described in Example 4. (a) Prior to the electrochemical activation process; (b) following the electrochemical activation process; (c) detailed view of the morphology following the electrochemical activation process.

ELECTROCATALYSTS ON CARBONITRIDE MATRICES

RELATED APPLICATIONS

This application is a 35 U.S.C. 371 national stage filing from International Application No. PCT/IB2016/055728, filed Sep. 26, 2016, which claims priority to Italian Application No. 102015000055603, filed Sep. 28, 2015, the teachings of which are incorporated herein by reference.

DESCRIPTION

The invention relates to electrocatalysts comprising a carbonitride matrix (CN) featuring good electrical conductivity, coordinating suitable catalytically active sites. In a preferred aspect of the invention, the aforesaid carbonitride matrix coordinates nanoparticles or aggregates of nanoparticles, on which the active sites of the electrocatalyst are located. In a preferred form of the invention, said carbonitride matrix covers suitable cores with good electrical conductivity. Said electrocatalysts are obtained through a process involving the pyrolysis of suitable precursors; in one aspect of the invention, the preparation process requires certain further steps. In one preferred aspect, the steps comprise one or more of the following: chemical treatments; electrochemical treatments; further pyrolysis processes.

FIELD OF THE INVENTION

Typical electrochemical conversion and electrical energy storage systems, e.g. primary and secondary batteries, fuel cells (FC), electrolyzers (EL), redox flow batteries (RFB), share the same basic structure, which consists of: (a) two electrode configurations, where the actual reduction-oxidation (redox) process takes place, which are separated by (b) a suitable electrolyte, which allows selective migration of ionic species (but not of electrons) and prevents the reagents mixing.

The electrode configuration plays a crucial role in the energy conversion operation and the operation of the storage devices, performing the following main functions: (a) creation of an electrical contact between the device and the external load; (b) transport of electrons to and from the interfaces between the electrolyte and each electrode configuration; (c) creation of a suitable environment where the redox processes involved in the operation of the device can be performed efficiently. In the case of open devices (for example, FCs, ELs and RFBs), the electrode configuration must also allow the easy migration of reagents and reaction products between the external environment and the interfaces between the electrolyte and the electrode configurations.

In general, the operating potential difference of a practical system for the conversion and storage of energy does not correspond to the theoretical potential expected on the basis of electrochemical processes carried out by a particular device. In most cases, this discrepancy is attributable to three main sources, namely: (a) losses attributable to the kinetics of the electrochemical reaction of the electrode configurations; (b) ohmic losses; (c) losses attributable to the transport of reagents and the products in the electrode compartments. The absolute and relative quantities of these losses mainly depend on: (a) the specific electrochemical process used by the device in question; (b) the functional components included in the device, (c) the functional conditions; e (d) the flow of electrons through the system.

In many cases, the kinetics of the electrochemical reactions which occur in the electrode configurations are extremely slow. Consequently, they generate high overvoltages and the efficiency of such devices lowers considerably. For example: (a) the oxygen reduction reaction (ORR) at T<250° C.; (b) the oxygen evolution reaction (OER) at T>250° C. (which typically occurs in ELs that operate at low temperatures); and (c) the electro-oxidation of alcohols and other small organic molecules at T<250° C. (which typically occurs in certain FCs that operate at low temperatures). To minimize losses and achieve performance levels that are consistent with the requirements of practical applications, it is necessary to accelerate the kinetics of the electrochemical processes stated above by means of a suitable electrocatalyst (EC).

An EC is able to increase the turnover of the electrochemical processes of interest occurring at active sites located in the surface of the catalytic material. The EC interacts with the redox species involved in the electrochemical process of interest. In general, the ECs are materially characterized by high electrical conductivity and a large surface area, and are capable of establishing a good ionic contact with the electrolyte.

Each electrode configuration of an FC operating at T<250° C. is usually constituted of a porous carbon-based system (e.g. carbon paper or carbon fabric) coated with a suitable electrocatalytic layer. Said carbon-based porous systems are often characterized by a multilayer structure, produced as follows. The reagents enter the porous system through a layer characterized by relatively large pores ("macroporous layer"). The reagents are then homogeneously distributed over the entire area of the electrode configuration by means of another layer characterized by very small pores ("microporous layer"). The porous system may undergo suitable treatments (e.g. impregnation with Teflon® or similar perfluorinated macromolecules) in order to modulate hydrophobicity. This also makes it possible to: (a) prevent flooding in electrode configurations that employ gaseous reagents, and (b) promote the absorption of liquid reagents. Finally, the electrocatalytic layer is applied to the microporous layer. The electrocatalytic layers comprise the EC and a suitable binder ligand (or 'ligand'); additives may be added to regularize the hydrophilic nature of the system and/or facilitate the transport of ions to/from the electrolyte.

The state of the art of the ECs employed in FCs that operate at T<250° C. generally consists of metals, metal alloys, or nanoparticles of oxides on an active carbon core characterized by high electrical conductivity and a large surface area, such as Vulcan XC-72R. The active sites are located on the surface of the metal or the nanoparticles, whose chemical composition is modulated according to the applications. The ECs most suitable for FCs with acid electrolyte, for example, fuel cells with proton exchange membranes (PEMFC), high temperature fuel cells with proton exchange membranes (HT-PEMFC), and phosphoric acid fuel cells (PAFC), include nanoparticles comprising platinum group metals (PGM), which can form alloys with other metals to improve the performance of the EC for specific electrochemical processes and/or improve tolerance to contaminants. For example: (a) anode ECs designed to promote the electro-oxidation of hydrogen contaminated with traces of CO include Pt-Ru alloy nanoparticles; (b) anode ECs for the electro-oxidation of small organic molecules (for example, methanol, formic acid, ethanol) use nanoparticles of PGM alloyed with Ru and Rh; and (c) cathode ECs for oxygen reduction reaction (ORR) use nanoparticles of PGM alloyed with one or more metals from the first transition series (e.g. Cr, Fe, Co, and Ni). On the other hand, ORR electrocatalysts for application in anion exchange membrane fuel cells (AEMFC) do not require PGM, usually relying, instead, on active sites present on the surface of Au, Ag, or Ni or nanoparticles of oxidized metals.

The main features of the electrode configurations of an electrolyser (EL) are relatively similar to those of a fuel cell. However, in an EL, the operating potential (which is usually quite high) generally prevents the adoption of electrode configurations comprising carbon-supported electrocatalysts, which would otherwise be subject to fast degradation. The electrode configurations for ELs are generally constituted of Ni and Ti-based meshes/foams; ECs are based on non-carbon-nanoparticle-supported PGMs.

The specifications concerning the duration of the conversion and storage systems depend on the particular application. In general, mobile/portable devices must be able to operate for a few thousand hours, while stationary systems must have a durability in the order of tens of thousands of hours. Typic systems for the conversion and storage of energy do not work in a continuous fashion or under constant load. In actual fact, they must be able to tolerate stresses from start/stop cycles and from sudden changes in external loads, which rapidly increase the electrode potential. The latter promotes the degradation of all the functional components included in the energy conversion and storage system, with particular reference to electrode configurations and to ECs.

Ageing of the ECs occurs through the sintering/agglomeration of the nanoparticles that support the active sites; consequently, the specific active area of the EC decreases and the turnover frequency of the electrochemical processes is reduced. In supported ECs, performance can be further reduced due to the increase in electrical resistance of the material, triggered by degradation of the core. This problem is particularly relevant for both the ECs that include carbon-based cores and operate in oxidizing environments (e.g. in the cathode compartment of an FC).

Long-duration ECs with a high electrochemical performance can be created by subjecting a suitable precursor to pyrolysis, wherein such precursor may or may not include a core. U.S. Pat. No. 8,691,716, shown here for reference, relates to a method for producing ECs comprising a step consisting of the synthesis of materials having a controlled metal composition based on carbonitrides composed of a either a single metal or multiple metals, wherein the synthesis steps envisages: the preparation of a precursor; the application of a suitable thermal treatment to the precursor; the activation of the EC.

In the event that the precursor is prepared by means of sol-gel type reactions, the steps comprise: (i) preparation of a solution A, which may comprise both water and an organic solvent, together with an organic binder and at least one complex containing a transition metal coordinated by halides; (ii) the preparation of a solution B, which contains water, an organic binder and at least one cyanometallate complex; the mixing of solutions A and B. Publications Di Noto et al. Electrochimica Acta 55 (2010) 7564-7574 and WO2009157033, which are both incorporated herein for reference, describe a "core-shell" type EC, wherein the active sites of the metals are wrapped in carbonitride matrices, which are—in turn—supported on suitable electrically conductive nanoparticles (core), such as active carbon or metal nanopowders. Core-shell ECs are also described in Di Noto et al., ECS Meeting Abstracts (2014) #1499.

DESCRIPTION OF THE INVENTION

The invention relates to an electrocatalyst, as of now referred to as an "EC", comprising a carbonitride matrix characterized by good electronic conductivity, in which the catalytically active sites are embedded. The ECs commonly used in prior art are constituted of nanoparticles of noble metals, such as platinum or alloys thereof, embedded in a carbonitride matrix (shell) supported on an active carbon core according to a core-shell morphology. Funcitonality is guaranteed by the active electrocatalytic sites present on the surface of the noble metal nanoparticles. The active carbon carrier (core), characterized by high electrical conductivity, allows the active sites to be dispersed efficiently and ensures a good electrical contact between the active sites bonded to the metal nanoparticles of the carbonitride matrix and the external circuit. In general, the procedures used for the preparation of electrocatalysts in prior art generate metal nanoparticles which are simply adsorbed on the carbon core. There are no "strong" covalent bonds between the nanoparticles and the core. The materials described in the present invention are radically different from those of the prior art, since they include a carbonitride matrix which forms strong covalent bonds with the functional groups that characterize the core of the EC. Such structures are generally, but not necessarily, nanoparticles of metal, metal alloys, oxides or other. In this sense, the carbonitride matrix "coordinates" the nanoparticles that provide the active sites by means of "coordination nests"; the latter are mainly constituted of nitrogen atoms present in the matrix. The presence of strong covalent bonds between the active sites and the matrix is of crucial importance to obtain ECs which are capable of functioning in an efficient manner and at length. When the EC according to prior art is working, in operating conditions, within a device (for example, within a fuel cell), it undergoes various degradation processes. The main degradation processes are as follows: (1) elimination of the metal nanoparticles (which carry the active sites); and (2) agglomeration of these nanoparticles. These processes are facilitated by the weakness of the interactions between the nanoparticles and the core. If the interactions were strong, as in the case of the materials described in the present invention, the degradation processes described above would be inhibited and the ECs based on carbonitride matrices would be characterized by a longer working life.

In a preferred description of the invention, such carbonitride matrix (characterized by good electrical conductivity) covers suitable carriers characterized by large specific surface areas. Preferred carriers include carbon nanoparticles, carbon nanotubes, graphene sheets, and related materials, nanoparticles/nanosheets/nanowires comprising: (a) one or more metallic elements; and/or (b) silicon oxides; and/or (c) titanium oxide.

In a preferred description of the invention, said ECs are applied to a suitable macroscopic carrier characterized by high electrical conductivity, so that the aforesaid two components, known as the EC and macroscopic carrier, have a good electrical contact. Preferred macroscopic carriers include carbon paper, carbon fabric, carbon cloth, and cloth/wires/foams containing one or more metal elements. As of now, the resulting systems will be referred to as "electrode configurations".

The invention allows modulation of the properties of the interface between the electrode configuration and the electrolyte of an energy conversion and storage device. In one preferred aspect of the invention, this interface is capable of selectively promoting the kinetics of particular electrochemical processes involved in the functioning of such energy conversion and storage devices.

In a further preferred aspect of the invention, such carbonitride matrix (characterized by good electrical conductivity) includes the desired concentration of heteroatoms, such as carbon, oxygen, nitrogen, sulphur, phosphorus, arsenic, antimony and tellurium, or mixtures thereof; the concentration of heteroatoms is preferably greater than 0 and less than or equal to 20% by weight, with respect to the mass of the EC; the most recommended range is from 0.1 to 2%. In a still further preferred aspect of the invention, said carbonitride matrix (characterized by good electrical conductivity) coordinates one or more types of nanoparticles and/or aggregates of nanoparticles with the desired chemical composition, particle size, shape, and distribution. The active sites of the present invention for the electrochemical process of interest (such as the oxygen reduction reaction) are usually, but not necessarily, located on the surface of the nanoparticles "coordinated" by the carbonitride matrix. The electrocatalytic functionality depends on the chemical composition of the nanoparticles, but also on their size, their shape (for example, the electrocatalytic activity of a spherical nanoparticle differs within a particular process from that of a cubic nanoparticle even if both are the same size) and on their degree of dispersion (the "particle distribution"). In principle, it may be useful to synthesize an electrocatalyst comprising different types of nanoparticles, with different features (for example, different sizes). The nanoparticles can also be aggregated with each other, forming a sponge-like structure with extremely high electrocatalytic activity. The carbonitride matrix should have high electrical conductivity to ensure easy transport of electrons between the active site and the external circuit, thereby minimizing ohmic losses. The "best" nanoparticle size depends on the particular electrochemical process. In general, the best results are obtained if the size ranges from 3 to 50 nm, falling preferably between 3 and 15 nm.

In a still further preferred aspect of the invention, said nanoparticles and/or aggregates of nanoparticles comprise one or more metal species.

In a still further preferred aspect of the invention, said nanoparticles and/or aggregates of nanoparticles comprise one or more transition metal elements, together with one or more elements selected from: hydrogen, oxygen, nitrogen, carbon, boron, sulphur, phosphorus, silicon, arsenic, selenium, tellurium, and antimony.

In a further preferred aspect of the invention, the chemical composition of said nanoparticles and/or aggregates of nanoparticles is controlled so that the surface of said nanoparticles/aggregates of nanoparticles can either have or not have the same chemical composition as the core of the aforesaid nanoparticles/aggregates of nanoparticles. The invention refers to the procedure adopted for the preparation of the aforementioned EC.

DESCRIPTION OF THE FIGURES

FIG. 2. Two typical preparation schemes for the hybrid inorganic-organic precursor.

FIG. 6. Comparison of the performance of a membrane electrode assembly (MEA) wherein the catalyst is deposited on the gas diffusion electrode (GDE). (a) MEA bearing GDEs obtained as described in Example 1; (b) MEA bearing GDEs obtained as described in Example 2. $H_2$ flow rate (anode): 800 mL per minute (sccm); $O_2$ flow rate (cathode) =500 sccm; reagent flow temperature=85° C.; the reagent flows have a relative humidity of 100%; reagent flow pressure=65 psig; cell temperature=85° C.

DETAILED DESCRIPTION OF THE INVENTION

Figure 1:
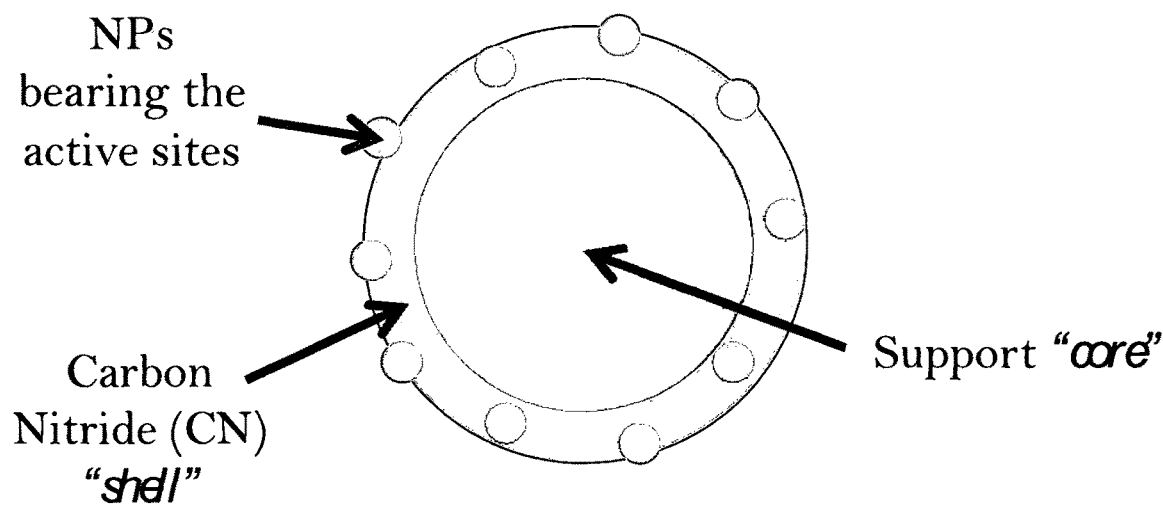
FIG. 1. A typical structure of the electrocatalyst claimed in this patent.

In a still further preferred aspect of the invention, a hybrid inorganic-organic precursor is obtained by means of coordination of the atoms of the desired metal with suitable molecular or macromolecular crosslinkers. The coordination is performed by means of suitable heteroatoms, which include carbon, hydrogen, nitrogen, sulphur, phosphorus, arsenic, antimony and tellurium. Preferably, the coordination is performed by means of heteroatoms of nitrogen and/or oxygen, carried by molecular or macromolecular crosslinkers. FIG. 2 shows two typical preparation schemes for the hybrid inorganic-organic precursor. The precursor used in the electrocatalyst preparation claimed by this invention has the following fundamental features:

1. It is a macromolecular system, characterized by a three-dimensional cross-linked structure.
2. It consists of two essential elements: (a) one or more "compounds in which the metal atoms are coordinated by suitable ligands"; and (b) an "organic crosslinker", which can be of the molecular kind (such as saccharose) or of the macromolecular kind (for example, polyacrylonitrile, PAN).

3. Each "organic crosslinker" can form at least two strong covalent bonds with the "compounds in which the metal atoms are coordinated by suitable ligands" mentioned above. This means that the organic crosslinker becomes part of a cross-linked precursor of a catalyst according to the present invention.

4. In the end, the metal atoms included in the precursor are chemically bonded to the cross-linking agent through strong covalent bonds. It is preferable that each metal atom included in the precursor is linked thereto by means of oxygen or nitrogen atoms. In other words, within the precursor, it is preferable that the metal atoms are "chelated" by means of oxygen or nitrogen atoms included in said precursor.

Such precursor could be obtained through two distinct synthesis protocols, as shown schematically in FIG. 2 and disclosed in both WO20009157033 and Di Noto et al. Electrochimica Acta 55 (2010) 7564-7574, both of which are incorporated herein by reference.

Protocol 1 produces the precursor of the HIO-PN kind, i.e. a hybrid inorganic-organic polymer network. In this synthesis protocol, the macromolecular crosslinker (for example, polyacrylonitrile) is dissolved in a suitable solvent (for example dimethylformamide). To obtain the HIO-PN precursor, the crosslinker and the chemical compounds containing the desired metal atoms must be dissolved in the same solvent. In this way, the crosslinker and the chemical compounds containing the desired metal atoms come into close contact and can therefore react chemically with one another, forming strong covalent bonds. In general, the crosslinkers are not soluble in water, but in suitable organic solvents; conversely, the typical inorganic compounds comprising metal atoms (usually based on sulphates, nitrates or metal chlorides) are almost exclusively water-soluble. Moreover, the preparation of the HIO-PN precursor usually includes four other steps, which are shown in the summary diagram on the right-hand side of FIG. 2.

1) Dissolution of the crosslinker (for example, polyacrylonitrile) in a suitable solvent (for example dimethylformamide; see B in FIG. 2)

2) Preparation of the chemical compounds comprising metal atoms, which are soluble in the same solvent as used for the crosslinker; (for example, the preparation of the of acetonitrile-coordinated palladium or nickel complexes; these complexes are soluble in dimethylformamide; see A and C in FIG. 2)

3) Addition of the chemical compounds obtained in step (2) to the solution containing the ligands obtained in step (1); this is followed by the cross-linking process, from which the HIO-PN-type precursor is formed.

4) The solvent is removed by means, for example, of evaporation. Alternatively, it is possible to precipitate the HIO-PN precursor by adding a second solvent in which said precursor is insoluble (usually water); the solid product obtained (the precursor) is then filtered and appropriately washed.

Protocol 2 produces the precursor of the Z-IOPE kind (Zeolitic inorganic-organic polymer electrolyte). In this synthesis protocol, the Z-IOPE precursor is obtained by mixing together two solutions. A first solution (A in FIG. 2) comprises one or more complexes of metal atoms coordinated by good leaving groups (usually chlorides) and the selected molecular crosslinker. These metal atoms must belong to soft elements characterized by high polarizability, such as Ru, Rh, Pd, Ag, Cd, In, Sn, Re, Os, Ir, Pt, Au, Hg, Tl, Pb, Bi. The crosslinker must have a high concentration of hydroxyl groups; saccharose is a typical example. The second solution (B in FIG. 2) comprises one or more complexes of metal atoms coordinated by cyano, thiocyano, or isocyano ligands (e.g. $K_2[Ni(CN)_4]$ or $K_3[Co(CN)_6]$) and the selected molecular crosslinker.

The two solutions A and B must be mixed at this point: the reaction mixture obtained from A+B in FIG. 2 must be monophasic. In general, the solvent used for both A and B is for water; the crosslinker used (saccharose or polyethylene glycol) is soluble in water; the metal complexes are soluble in water. The reagent mixture (which includes the solvent, the desired crosslinker and the various metal complexes) develops a series of complex chemical balances. The "anion complex," i.e. the negatively charged complex, forms quickly, including all the metals introduced which are interconnected by cyano/isocyano/thiocyano groups. The system formed by the solvent, crosslinker, and the complexes is known as a "sol". These complexes subsequently undergo a cross-linking process via the molecules of the selected crosslinker. The viscosity of the reagent mixture ("sol") increases considerably; a "sol-gel" transition occurs, producing a gel. The cross-linking process is followed by the progressive expulsion of the solvent; the gel becomes a material with plastic mechanical properties. This material is the Z-IOPE precursor.

In a still further preferred aspect of this invention, said hybrid inorganic-organic precursor is obtained by mixing two reagent solutions. The first reagent solution is composed of: (a) water, one or more solvents with high permittivity or any combinations thereof; (b) one or more molecular or macromolecular crosslinkers characterized by a high concentration of —OH groups (for example, monosaccharides such as glucose, fructose and galactose; disaccharides such as saccharose, lactose and maltose; polymers such as polyethylene glycol, polyvinyl alcohol, and others); and (c) one or more soft metal species (for example, Ru, Rh, Ag, Pd, Cd, In, Sn, Re, Os, Ir, Pt, Au, Hg, Tl, Pb, Bi) coordinated by good leaving groups, (e.g. $Cl^-$, $Br^-$, $I^-$, $NO_3^-$, $ClO_4^-$). The latter reagent solution contains the same solvent and molecular/macromolecular crosslinker; it also includes one or more transition metal species or species of the main groups coordinated by bidentate ligands, such as groups of cyano, thiocyano, or isocyano.

In a still further preferred aspect of the invention, said hybrid inorganic-organic precursor is obtained by mixing one or more reagent solutions. A reagent solution is composed of: (a) a suitable solvent such as water, acetonitrile, N-methyl-pyrrolidone, dimethylformamide, dimethylacetamide or any combinations thereof; and (b) a macromolecule which is soluble in such solvent (for example, polyacrylonitrile, or one of the macromolecules belonging to the polybenzimidazole family). The other reagent solution comprises: (a) a suitable solvent, as stated above; and (b) one or more metal complexes coordinated by ligands such as halides, acetonitrile, and nitrate.

In one preferred form of the invention, one or more of said reagent solutions also include one or more suitable carriers. Preferred carriers comprise carbon nanoparticles, carbon nanotubes, graphene sheets or similar materials, nanoparticles/nanosheets/nanowires comprising one or more metal elements. In the latter group, the preferred carriers include nanoparticles of gold, copper, nickel and zinc or alloys thereof. Other carriers include nanoparticles/nanosheets/nanofoams of silicon oxide and titanium oxide.

Preferably, the surface of the aforesaid carriers is functionalized with the same functional groups as the species used as the molecular/macromolecular crosslinkers. Preferentially, the groups present on the surface are as follows: hydroxyl, ketone, ether, carboxyl, amino, amido, cyano, isocyano, and thiocyano.

Preferably, the mixture obtained by mixing all the reagent solutions is vigorously homogenized (for example by agitation or tip sonication). Subsequently, in one form of the invention, the mixture temperature is controlled; the typical temperature values range from 25° C. to 180° C. Preferably, the temperature of the mixture is kept constant for 12-96 hours, more preferably for 72 hours.

The aforesaid inorganic-organic precursor is obtained by removing the solvents originally included in the reagent mixture from the aforesaid mixture. In a preferred form of the invention, the solvents are removed by evaporation in the open air at a temperature ranging from 25° C. to 190° C. for 24 hours.

The aforementioned organic-inorganic hybrid precursor, which may or may not include a carrier, undergoes a pyrolysis process. Preferably, said pyrolysis process is conducted under vacuum at a pressure of less than 10 mbar or at a pressure of 1 bar in an inert atmosphere of helium or argon, nitrogen, carbon dioxide or a mixture thereof. Preferably, said pyrolysis process includes more than one step, each one thereof being conducted at increasing temperatures. Preferably, the first step is conducted at a temperature of between 100 and 400° C., for a duration of 2 to 24 hours. Preferably, the second and subsequent steps are conducted at a temperature of between 400 and 1000° C., for a duration of 2 to 8 hours.

In a still further aspect of the invention, said thermal treatment may be carried out under a reducing atmosphere, obtained by mixing an inert gas such as helium, argon, nitrogen, or carbon dioxide with a reducing gas such as hydrogen.

In a still further preferred aspect of the invention, the product of said pyrolysis process undergoes treatment at room temperature and room pressure with a suitable liquid capable of removing the reaction by-products. More preferably, said liquid is water.

In a further embodiment of the present invention, such liquid comprises a solute capable of reacting with the product of the pyrolysis process, giving rise to an "etching" process. Preferred solutes are: (a) acids, such as hydrofluoric acid, hydrochloric acid, hydrobromic acid and hydroiodic acid; (b) acids, such as sulphuric acid and perchloric acid; (c) acids, such as formic acid and acetic acid; (d) bases, such as sodium hydroxide, potassium hydroxide, rubidium hydroxide, and cesium hydroxide; (e) bases, such as ammonia and amines; (f) reducing agents, such as sodium borohydride, lithium aluminium hydride, hydrazine; and (g) oxidizing agents, such as hydrogen peroxide.

In a still further form of the present invention, the aforesaid additional treatment and the pyrolysis and etching steps are implemented, each one being characterized by its own set of experimental parameters (for example: temperature, pressure, and composition of the liquid phase).

The product of the aforesaid pyrolysis process and subsequent further steps consisting of etching and pyrolysis treatment, if conducted, is the EC.

In a particular form of the invention, said EC could be distributed over a macroscopic carrier characterised by high electrical conductivity, hereby generating the "electrode configuration." Preferably, said macroscopic carrier characterized by high electrical conductivity is porous. Extremely preferably, said macroscopic carrier characterized by high electrical conductivity consists of the following systems: (a) single/multi-ply carbon paper, carbon cloth, or carbon fabric; and (b) meshes or foams made of metal atoms or alloys thereof.

Preferably, a binder is added to achieve an intimate contact between said EC and said macroscopic carrier characterized by high electrical conductivity. More preferably, said binder is a macromolecular system capable of promoting transport of the ions supplied by the electrolyte of the end energy conversion and storage device, and includes perfluorinated macromolecules capable of exchanging protons, e.g. Nafion®, Hyflon-Ion®, Aquivion®, and macromolecules of the polybenzimidazole family (for example poly [2,2'- (m-phenylene)-5,5'-bibenzimidazole])

In one aspect of the invention, said EC or said electrode configuration undergoes electrochemical treatment by means of immersion in a suitable electrolyte. Preferably, said electrolyte consists of water that dissolves a strong base or a strong acid. More preferably, said strong base includes lithium hydroxide, sodium hydroxide, potassium hydroxide, rubidium hydroxide, and cesium hydroxide, or a mixture thereof. Still more preferably, said strong acids include perchloric acid, nitric acid, sulphuric acid, hydrofluoric acid, hydrochloric acid, hydrobromic acid, hydroiodic acid, or a mixture thereof.

In one preferred form of the invention, a suitable gas is insufflated into said electrolyte during the electrochemical treatment. Preferably, said gas includes inert species such as helium, argon, nitrogen, carbon dioxide or a mixture thereof. Preferably, said gases include reducing agents such as hydrogen. Preferably, said gases include oxidising agents, such as oxygen, chlorine or a mixture thereof. Preferably, said gases include one or more species, all of which are oxidizing or reducing agents, mixed with inert species.

In one form of the invention, the temperatures at which such electrochemical treatment is conducted is controlled within a range of 10 and 90° C.

In a preferred form of the invention, said electrochemical treatment consists in applying a controlled electrochemical potential from the outside by means of a potentiostat/galvanostat. There are two types of time-related potential profiles: potentiostatic (constant potential) and potentiodynamic (the potential varies in a linear fashion over time). Preferably, said potentiostatic profiles have a duration between 1 to 3600 seconds while the potentiodynamic profiles have a scan velocity ranging from 1 to 200 mV/sec. Preferably, the electrochemical treatment are performed between −1 and 2 V vs. NHE.

In a still further aspect of the invention, more than one electrochemical treatment is conducted, each one being characterized by its own parameters, which may or may not be the same as in the previous steps.

The "electrochemical treatment" consists in applying a controlled electrochemical potential (which may be either fixed or variable over time) to the EC or to the electrode configuration. During the electrochemical treatment, the EC or the electrode configuration are immersed in an appropriate "electrolytic solution" (i.e. capable of conducting ions). Generally, the electrolytic solution is aqueous. The following experimental parameters are controlled:

pH values of the solution.

Chemical composition of the solution, with particular attention to the dissociated ionic species present.

Chemical composition of gas insufflated into the electrochemical solution.

Temperature.

The main objective of the electrochemical treatment is to perform the selective removal of certain chemical species present in the EC. For example, take the ECs obtained as described in Example 1. Following the pyrolysis treatment, the washing with water, and the hydrogen peroxide treatment, PtNi $CN_1$-600/Ni and PtNi $CN_1$-900/Ni ECs are obtained. These ECs are formed of a nickel core wrapped in a thin layer (a few nanometres thick) of carbonitride matrix. The stoichiometric coefficient between platinum and nickel in both ECs is to 1:100. The platinum is present mainly in the vicinity of the interface between the carbonitride shell and the nickel core.

There are two metal phases in the PtNi $CN_1$-600/Ni electrocatalyst: (1) the nickel particles of the core; (2) an alloy with a platinum to nickel ratio of 1:1. The PtNi $CN_1$-900/Ni electrocatalyst, meanwhile, features solely one metal phase, which could be associated with the nickel particles of the core. In the latter material, the platinum atoms are dispersed in the nickel core, where they are penetrated, by diffusion, during the pyrolysis treatment, and do not form a separate phase.

The ECs obtained in this way (for example PtNi—$CN_1$-600/Ni and PtNi—$CN_1$-900/Ni) are ground together with the active carbon to produce a mixture characterized by good electrical conductivity and porosity. This mixture is subsequently used for the production of: (1) RDE layers (to perform "ex situ" characterizations using rotating disc electrode methodology); and (2) electrocatalytic layers, which are applied to gas diffusion electrodes (GDE), thereby obtaining an electrode configuration used in of individual fuel cell prototypes.

At this point, the RDE layers and the electrocatalytic layers obtained are unable to promote the oxygen reduction reaction in an acid environment. Therefore it is necessary to proceed with appropriate treatment consisting of the electrochemical activation of the EC.

The electrochemical activation treatment proposed for PtNi—$CN_1$-600/Ni and PtNi—$CN_1$-900/Ni involves the application of an electrochemical potential which first increases linearly from 0.05 to 1.2 V vs. RHE (reversible hydrogen electrode), and then decreases linearly from 1.2 to 0.05 V vs. RHE. The variation velocity of the potential is the same in both steps, and amounts to 0.1 V s$^{-1}$. This cycle of increase and decrease in the applied potential is repeated several times, in accordance with the cyclic voltammetry experiments. Thanks to this operation, the surface concentration of the platinum atoms increases and the latter then go on to form efficient active sites for the oxygen reduction reaction in an acid environment.

The RDE and the electrocatalytic layers which undergo this electrochemical activation are immersed in an electrolytic solution containing water thermostated at 25° C. and including 0.1 M $HClO_4$. As a result, the pH of the electrolytic solution used during the electrochemical activation proposal for PtNi—$CN_1$-600/Ni and PtNi—$CN_1$-900/Ni amounts to 1; the electrolytic solution includes 0.1 M $ClO_4^-$ anions, because the latter do not adsorb on the metal's surface.

After a certain number of potential variation cycles, both the electrolytic solutions and the gases insufflated therein are changed (from pure oxygen to nitrogen and back).

The nickel atoms present in PtNi—$CN_1$ 600/Ni and PtNi—$CN_1$ 900/Ni are oxidized starting from the nickel metal atoms (oxidation state=0) to the nickel cations (oxidation state=+2) at pH 1, in the presence of an aqueous solution at 25° C. containing non-coordinating anions (anions such as perchlorate), when the potential ranges from 0.05 to 1.2 V vs. RHE. These nickel cations are gradually removed from the EC during the electrochemical activation treatment and dissolve in the electrolyte solution; when the latter is replaced, the nickel expelled by the electrocatalysis is removed from the system definitively. The presence of the oxidizing atmosphere, guaranteed by the presence of gaseous oxygen, promotes the oxidation processes; these processes are slowed down by the presence of nitrogen, which then forms an inert atmosphere.

At the same time, the activation treatment does not significantly influence the presence of the platinum atoms in the system. In fact, with the environmental conditions described in the previous paragraph, the platinum does not undergo the oxidation process and remains in the form of metallic platinum (oxidation state=0), which does not dissolve in the electrolyte solution, remaining instead in the $CN_1$ 600/Ni and PtNi—$CN_1$900/Ni electrocatalyst.

Consequently, the proposed electrochemical activation treatment removes the majority of Ni atoms present in the PtNi—$CN_1$ 600/Ni and PtNi—$CN_1$ 900/Ni EC. The platinum atoms concentrate and spontaneously reorder to create the isolated nanoparticles or aggregates of nanoparticles, characterized by a sponge morphology. The carbonitride matrix does not undergo degradation caused by the electrochemical treatment proposed; it continues to coordinate the nanoparticles or aggregates of nanoparticles and to ensure a good electrical contact between the active sites (present on the surface of the nanoparticles or in the aggregates of nanoparticles) and the external circuit. The surface area of the nanoparticles or aggregates of nanoparticles obtained is large, i.e. in the order of several tens of square metres per gram of platinum.

Figure 3:
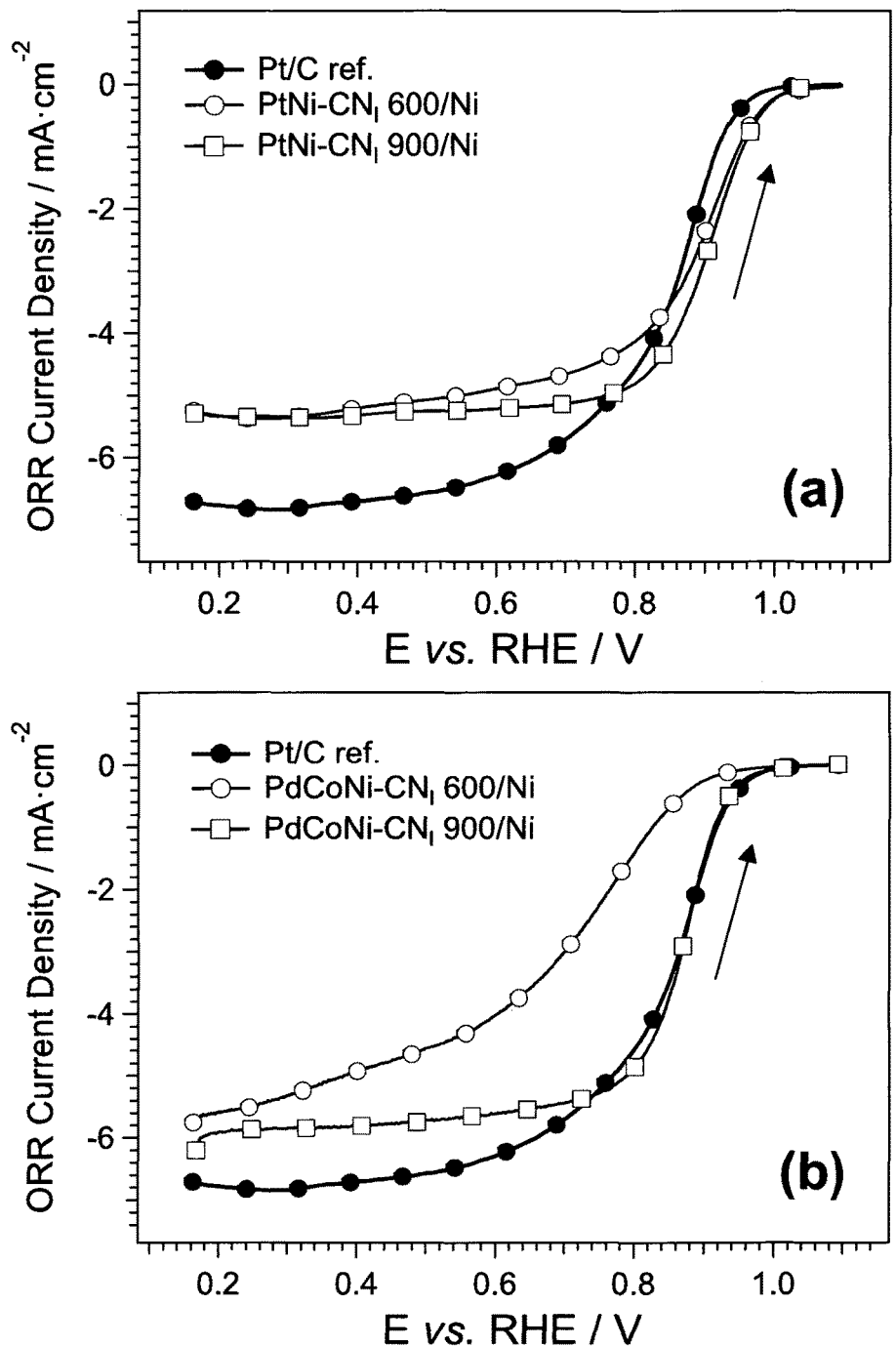
FIG. 3. Comparison of the electrochemical performance for the oxygen reduction reaction (ORR) of electrocatalysts deposited as layers on a rotating disc electrode (RDE); (a) "RDE layer" obtained as stated in Example 1; (b) RDE layers obtained as described in Example 2. Electrolyte: 0.1 M $HCl_4$; sweep rate: 20 mV s$^{-1}$; T=25° C.; RDE rotation velocity=1600 rpm.
Figure 4:
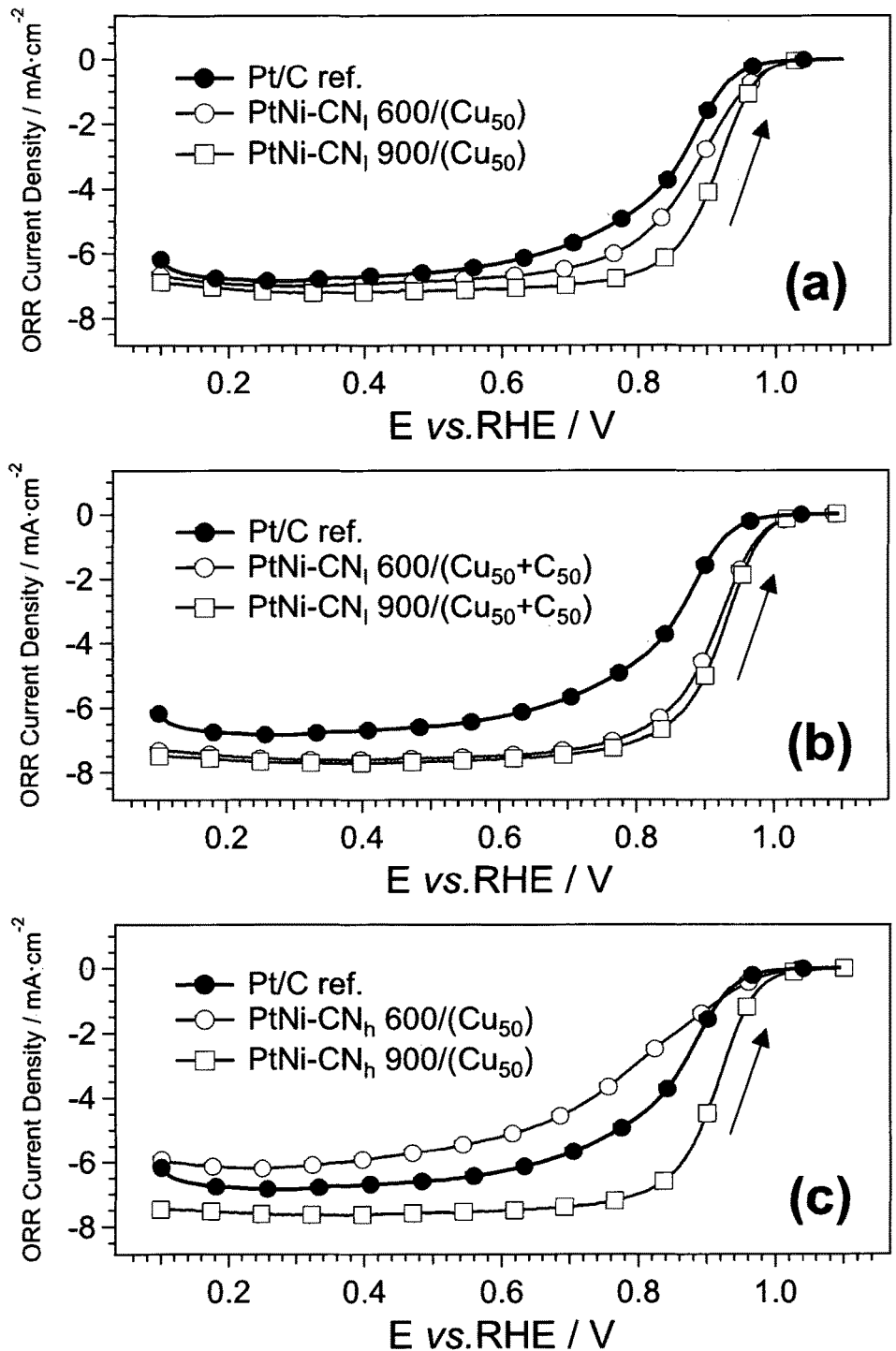
FIG. 4. Comparison of the ORR performance of the RDE layers. (a) and (b) RDE layers obtained as described in Example 3; (c) RDE layers obtained as described in Example 4. Electrolyte: 0.1 M $HCl_4$. Sweep rate: 20 mV s$^{-1}$; T=25° C.; RDE rotation velocity=1600 rpm.
Figure 5:
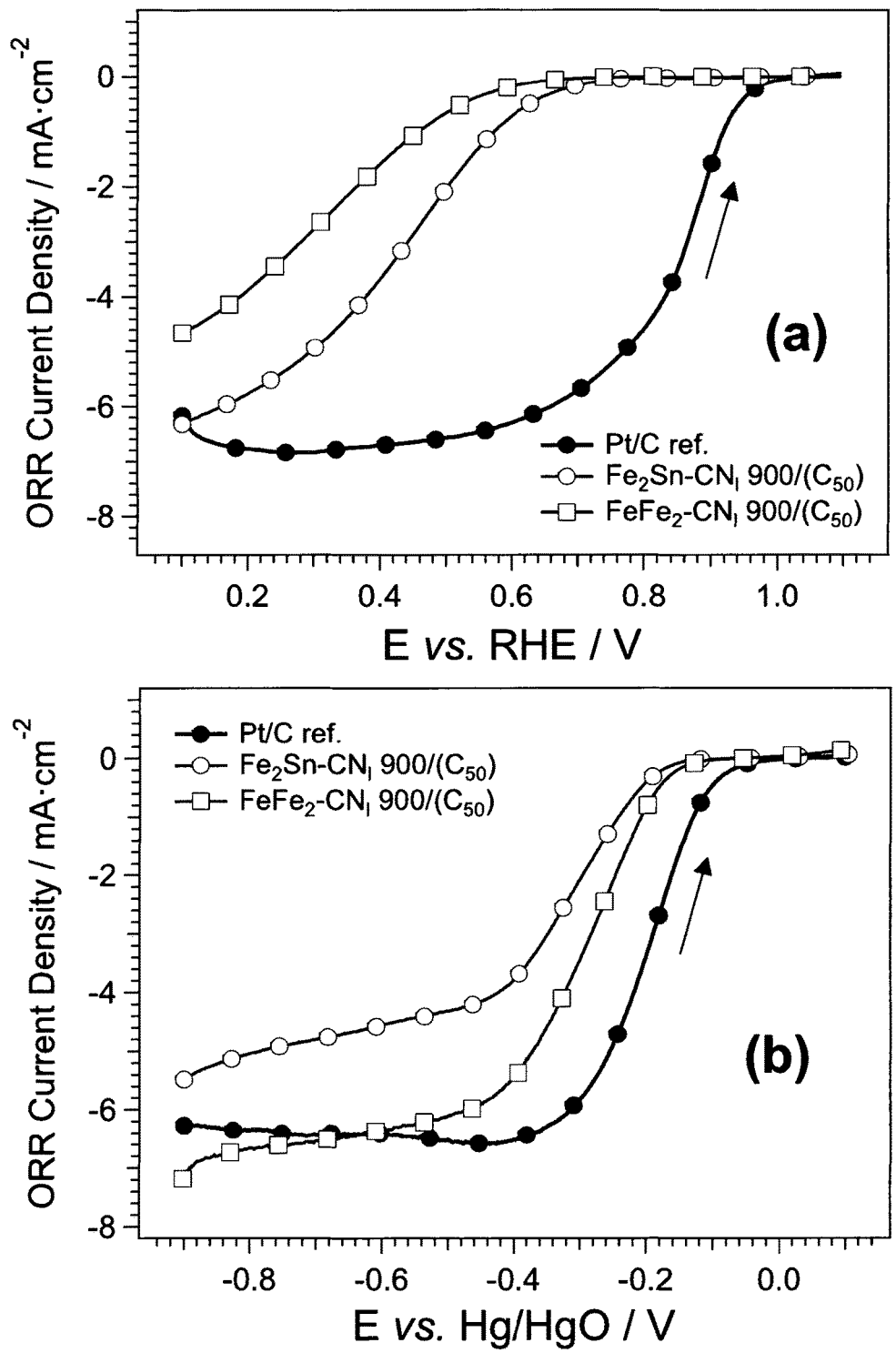
FIG. 5. Comparison of the ORR performance of the RDE layers obtained as described in Example 5 and Example 6. Sweep rate: 20 mV s$^{-1}$; T=25° C.; RDE rotation velocity=1600 rpm. (a) Electrolyte: 0.1 M $HCl_4$ (b) Electrolyte: 0.1 M KOH.
Figure 7:
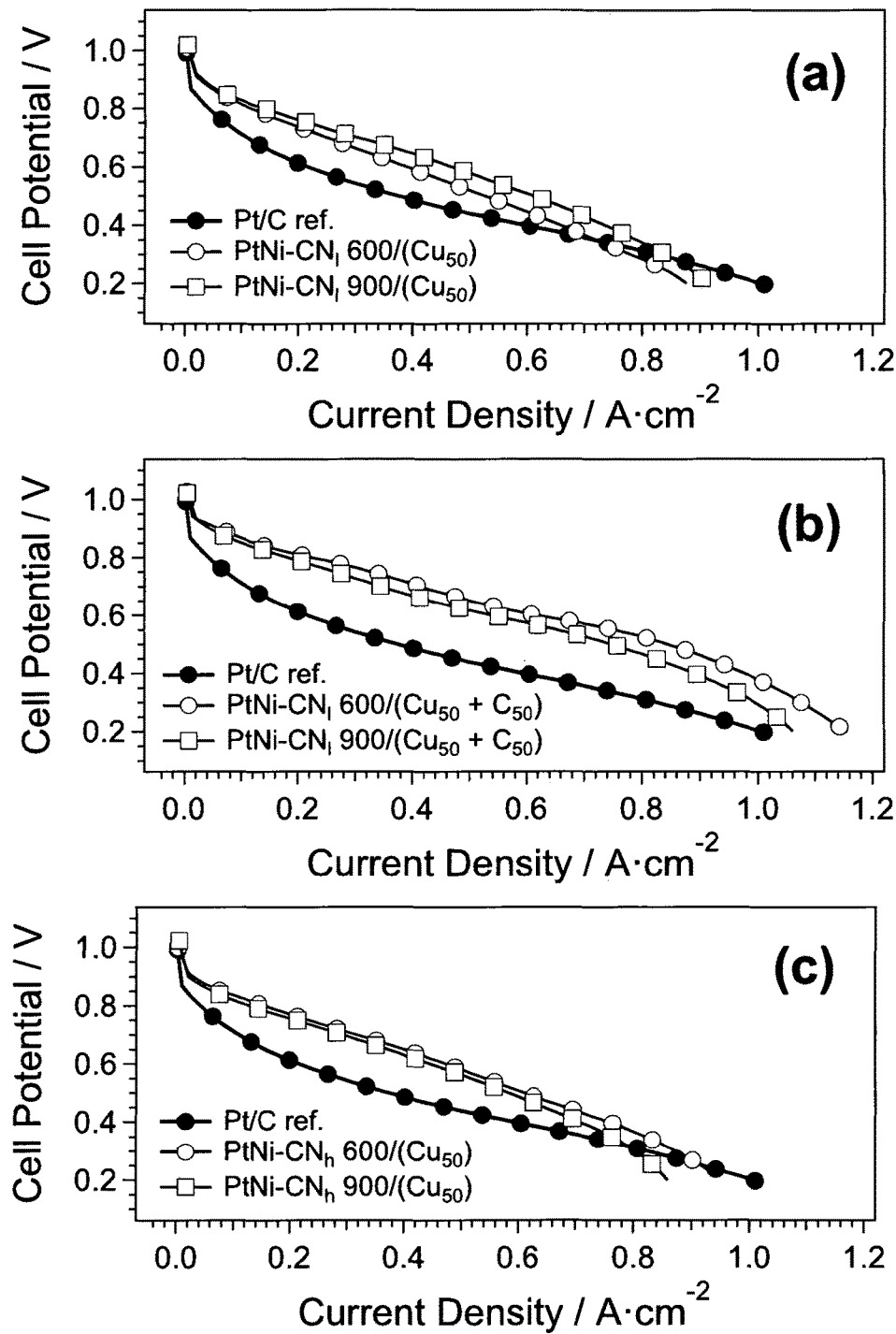
FIG. 7. Comparison of the performance of the MEAs bearing the GDEs. (a) and (b) MEAs bearing GDEs obtained as described in Example 3; (c) MEAs bearing GDEs obtained as described in Example 4. $H_2$ flow rate (anode) =800 sccm; $O_2$ flow rate (cathode)=500 sccm; reagent flow temperature=85° C.; the reagent flows have a relative humidity of 100%; reagent flow pressure=65 psig; cell temperature=85° C.
Figure 8:
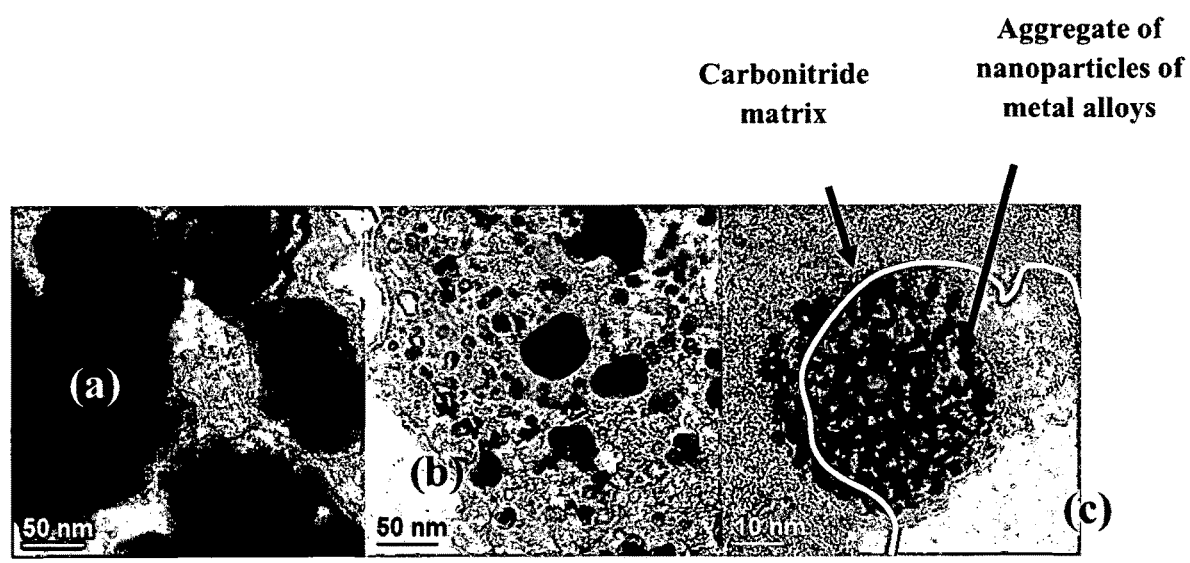
FIG. 8. Evolution of the morphology of PtNi—CNl 900/Ni following application of the electrochemical activation process as described in Example 1. (a) prior to the electrochemical activation process; (b) following the electrochemical activation process; (c) detailed view of the morphology following the electrochemical activation process.
Figure 9:
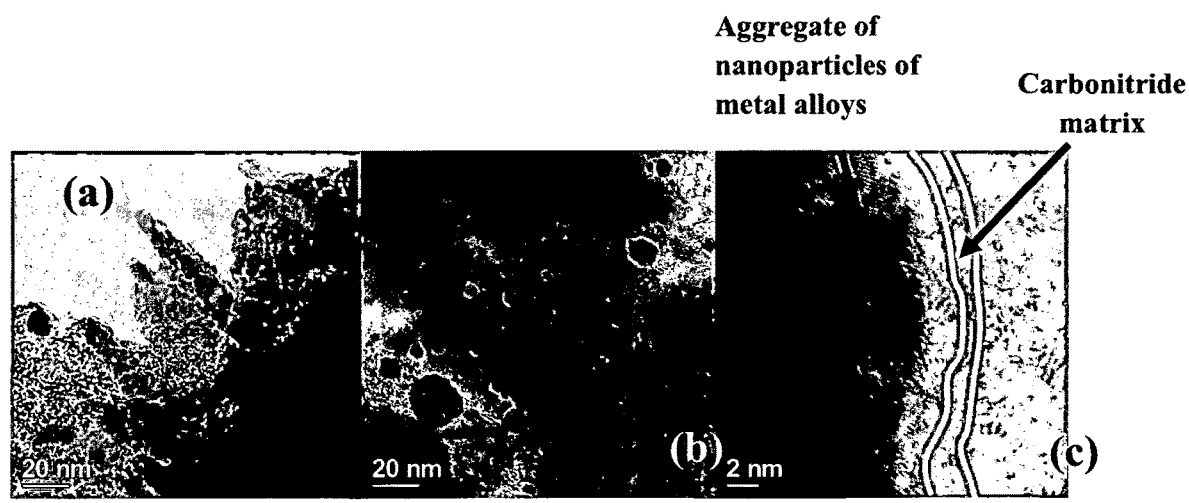
FIG. 9. Evolution of the morphology of PtNi—CN1 900/($Cu_{50}+C_{50}$) following application of the electrochemical activation process as described in Example 3. (a) Prior to the electrochemical activation process; (b) following the electrochemical activation process; (c) details of the morphology following the electrochemical activation process.
Figure 10:
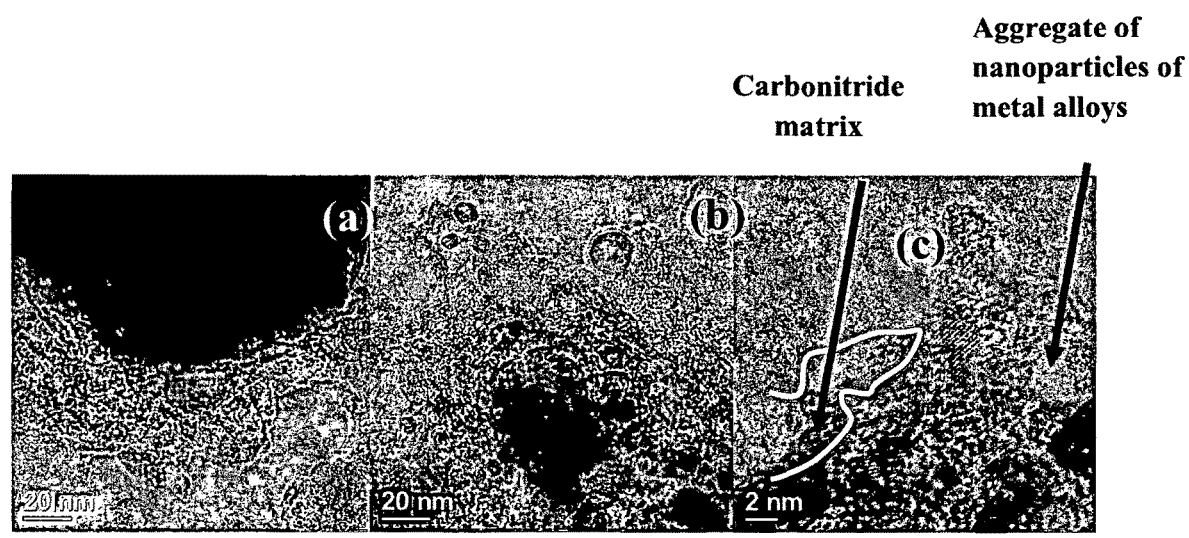
FIG. 10. Evolution of the morphology of PtNi—$CN_h$ 900/($Cu_{50}$) following application of the electrochemical activation process as described in Example 4. (a) Prior to the electrochemical activation process; (b) following the electrochemical activation process; (c) details of the morphology of the electrochemical activation process.

It should be noted that the proposed electrochemical activation does not remove 100% of the nickel atoms originally present in the EC. At the end of the electrochemical activation process, the PtNi—$CN_1$ 600/Ni and PtNi—$CN_1$ 900/Ni feature different phases associated with the Pt—Ni alloy nanoparticles characterized by a Pt/Ni atomic ratio of approximately 4:1. The active sites on the surface of the nanoparticles of the Pt/Ni alloys obtained by electrochemical activation treatment have higher electrocatalytic activity than occurs in the oxygen oxidation reaction conducted in an acidic environment, and significantly higher than in similar active sites on the surface of pure platinum nanoparticles (see the comparative example). In conclusion, the proposed electrochemical treatment transforms systems which do not show appreciable activity with respect to the oxygen reduction reaction in an acidic environment (i.e. PtNi—$CN_1$ 600/Ni and PtNi—$CN_1$ 900/Ni) into activated ECs with: (a) a large surface area; (b) a chemical composition which guarantees inherently higher activity than that of the oxygen reduction reaction. These properties originate from the excellent performance with respect to the ORR (both of which are determined "ex situ"), wherein the fuel cell prototypes work in operative conditions (see FIG. 3 and FIG. 6).

Systems with different chemical compositions require different electrochemical activation treatments, in order to optimise the performance of the activated ECs. For example, in the case of systems containing palladium (see Example 2), the maximum potential used during the electrochemical activation treatment amounts to 0.8 V vs. RHE; if more potential is used, the palladium oxidizes and dissolves in the electrolyte solution, resulting in a drop in the performance of the EC thus activated. However, in the case of systems containing a copper core (see Examples 3 and 4), the minimum potential used during the electrochemical activation treatment amounts to 0.5 V vs. RHE; if lower potentials are reached, the oxidized copper is redeposited in the active sites, thereby decreasing activity. Also in the case of systems containing a copper core, the electrochemical activation treatment reaches no more than to 0.9 V vs. RHE; if a higher potential is reached, the platinum nanoparticles are aggregated, thereby decreasing the electrocatalytically active area;

If the electrolytic solution comprises coordinating ions (for example chlorides), which may react with the chemical species present in the EC, it is possible to vary the potential in which certain chemical species can be dissolved.

In principle, this could allow better management of the features of the product of the electrochemical activation treatment. As a result, the description of the invention and the claims consider all the different experimental parameters which may be varied during execution of the electrochemical activation process.

The present invention describes the preparation of the electrocatalysts through four main steps, which are conducted in the following order:

1. Preparation of the precursor: the precursor may include appropriate carriers (also called cores)
2. Precursor pyrolysis treatment, which comprises two or more stages
3. Chemical treatment of the product
3a. Further process consisting of the pyrolysis of the products thus obtained
4. Treatment of electrochemical activation of the product Steps 1 and 2 are fundamental in order to obtain the EC. In general, Steps 3 and 4 are optional and are referred to as "post-synthesis treatments". In the description of the invention, the post-synthesis treatments are conducted following a specific order: in the beginning, one or more chemical treatments are conducted, which are—optionally—interspersed with additional pyrolysis processes; the electrochemical activation treatments are performed at the end of the synthesis protocol.

The present invention therefor relates, first and foremost, to a method for making an electrocatalyst which comprises the steps of (i) preparing a precursor, (ii) adsorbing the precursor on the surface of conducting support particles to obtain a core-shell system; (iii) applying a thermal treatment to the thus-obtained core-shell system to obtain a core-shell electrocatalyst; (iv) activating the thus-obtained core-shell electrocatalyst.

According to one aspect of the invention, the core-shell electrocatalyst may be activated electrochemically and/or thermally.

In particular, the electrochemical activation is carried out by applying an electrochemical potential, which may be constituted of at least one cycle of increasing and decreasing potential, and preferably from 10 to 100 cycles. According to a further aspect of the invention, the electrochemical potential increases linearly from −1 to 2 V vs. RHE and decreases from 2 to −1 V vs. RHE, and preferably increases linearly from 0.05 to 1.2 V vs. RHE and decreases linearly from 1.2 to 0.05 V vs. RHE. Preferably, the electrochemical potential is applied while the controlled system temperature is kept within a range of 10 to 90° C.

According to a still further aspect of the invention, said electrochemical potential is applied to an acid or basic water solution, preferably at a pH from 0 to 3 or at a pH from 11 to 14. Said acid water solution may contain perchloric acid, nitric acid, sulphuric acid, hydrochloric acid, hydrobromic acid, hydroiodic acid or a mixture thereof and that said basic water solution may contain lithium hydroxide, sodium hydroxide, potassium hydroxide, rubidium hydroxide, cesium hydroxide or a mixture thereof.

According to a still further aspect of the invention, an inert gas may be bubbled into said acid or basic water solution, preferably helium, argon, nitrogen, carbon dioxide or a mixture thereof. In particular, the inert gas may be bubbled together with a reducing gas, such as hydrogen, or with an oxidizing gas such as oxygen, chlorine or a mixture thereof.

According to a still further aspect of the invention, the thermal activation may include first treating the core-shell electrocatalyst with a polar liquid, preferably with a water solution;

subsequently drying and then heating to a temperature from 400 to 1000° C., preferably from 850 to 950° C. The drying step may be carried out at 50 to 70° C. for 18 to 30 hours, preferably at 60° C. for 24 hours. More in detail, the aqueous solution may contain: at least one acid, such as hydrofluoric acid, hydrochloric acid, hydrobromic acid, hydroiodic acid, sulphuric acid, perchloric acid, formic acid, acetic acid or a mixture thereof; at least one base, such as sodium hydroxide, potassium hydroxide, rubidium hydroxide, cesium hydroxide, ammonia, amines or a mixture thereof; and and at least one reducing agent, such as sodium borohydride, lithium aluminium hydride, hydrazine or a mixture thereof; or at least one oxidizing agent, such as hydrogen peroxide.

According to a still further aspect of the invention (case a), the precursor may be prepared through a sol-gel reaction which comprises: generating a solution A, wherein the solution A comprises water, an organic cross-linker, and at least one complex containing a transition metal coordinated by a good leaving group; generating a solution B, wherein solution B comprises water, at least one cyanometallate, thiocyanometallate or isocyanometallate and optionally an organic crosslinker; mixing solution A and solution B.

According to a still further aspect of the invention (case b), the precursor may be prepared by means of a sol-gel reaction which comprises: generating a solution A, wherein the solution A comprises water, a polar organic solvent, and at least one complex containing a transition metal coordinated by at least one good leaving group; generating a solution B, wherein the solution B comprises a polar organic solvent and an organic crosslinker bearing functional groups containing nitrogen; generating a solution C, wherein said solution C comprises water, a polar organic solvent, and at least one complex containing a transition metal coordinated by at least one good leaving group; mixing solution A with solution B and then mixing the resulting solution with solution C.

The good leaving group is preferably selected from among $Cl^-$, $Br^-$, $NO_3^-$ and $ClO_4^-$ The complex, meanwhile, is preferably selected from $HAuCl_4$, $H_2IrCl_6$, $H_2PtCl_6$, $Li_2PdCl_4$, $(NH_4)_2IrCl_6$, $(NH_4)_2OsCl_6$, $(NH_4)_2PdCl_6$, $(NH_4)_2PtCl_4$, $(NH_4)_2PtCl_6$, $(NH_4)_3RhCl_6$, $(NH_4)_2RhCl_6$, $KAuCl_4$, $K_2PtCl_4$, $K_2PtCl_6$, $K_2RhCl_6$, $K_2H_2OsCl_6$, $K_3IrCl_6$, $K_3H_3RuCl_6$, $Na_2Ircl_6$, $NaOsCl_6$, $Na_2PdCl_4$, $Na_2RhCl_6$, $CrCl_3$, $IrCl_3$, $FeCl_3$, $NiCl_2$, $OsCl_3$, $PdCl_2$, $PtCl_2$, $PtCl_4$, $RhCl_3$, $ReCl_5$, $SnCl_4$, $VCl_3$, $VCl_4$, $WCl_6$ and $ZrCl_4$. The cyanometallate is preferably selected from $KAg(CN)_2$, $KAu(CN)_2$, $K_2Ni(CN)_4$, $K_2Pd(CN)_4$, $K_2Pt(CN)_4$, $K_3Co(CN)_6$, $K_3Cr(CN)_6$, $K_3Fe(CN)_6$, $K_3Mn(CN)_6$, $K_2Pt(CN)_6$ and $K_4Ru(CN)_6$. The polar organic solvent is preferably selected from acetonitrile, N-methylpyrrolidone, dimethylformamide, dimethylacetamide or a mixture thereof.

In "case a", the organic crosslinker is preferably selected from monosaccharides, such as glucose, fructose and galactose; disaccharides such as saccharose, lactose and maltose; and polymer-rich hydroxides such as polyethylene glycol and polyvinyl alcohol; or a mixture thereof. In "case b", the organic crosslinker is endowed with functional groups containing nitrogen, such as polyacrylonitrile, polybenzimidazole or a mixture thereof.

According to a still further aspect of the invention, said conducting carrier particles may be made of carbon or graphene; silicon oxides or titanium oxides; gold, copper, nickel, zinc, or an alloy thereof; In particular, these may be constituted of conducting carriers particles having a size ranging from 3 to 50 nm, preferably from 3 to 15 nm. Such carriers may have the shape of nanoparticles, nanosheets or nanowires.

According to a still further aspect of the invention the thermal treatment (iii) comprises a first step at a temperature from 50 to 450° C. and at least a second step at a temperature from 300 to 1250° C. The first step may last from 2 to 24 hours and said second step may last from 2 to 8 hours. The heating may be carried out in an inert atmosphere or under vacuum, preferably from $10^{-2}$ to $10^{-4}$ bar, more preferably at about $10^{-3}$ bar; preferably, the atmosphere is an atmosphere consisting of inert species such as helium, argon, nitrogen, carbon dioxide or a mixture thereof.

The present invention also relates to the electrocatalysts obtainable by the method described above, as well as the fuel cells or electrolyzers containing them.

The following examples are provided as non-limiting illustrations of the present invention.

Example 1

Preparation of Pt-Based Electrocatalysts on Ni Cores

A first reagent solution, referred to henceforth as "A", is obtained by dissolving 400 mg of $K_2PtCl_4$ in the minimum amount of milli-Q water (approximately 2 mL), and dissolving 533 mg of saccharose in the minimum amount of Milli-Q water (approximately 1 mL); the resulting solution is then added to "A". 2158 mg of 50 nm sized nickel nanoparticles are added to "A"; the resulting suspension is homogenized by means of sonication performed with an ultrasound probe.

A second reagent solution, referred to as "B", is obtained in exactly the same way as "A", except that $K_2PtCl_4$ is not used. Instead, 332 mg of $K_2Ni(CN)_4$ is dissolved with a degree of hydration of approximately 30%.

Drop by drop, "A" is added to "B", which is kept under agitation. The product is kept under agitation for 24 hours. Subsequently, the agitation is stopped and the product is left to rest for 48 hours. Finally, the water is removed by means of evaporation into the air at 60° C. for 24 hours. A solid product is thus obtained, which is henceforth denoted "C".

C undergoes a three-stage pyrolysis process under a dynamic vacuum of $10^{-3}$ bar, described as follows: the first stage is performed at 120° C. for 8 hours, the second stage is performed at 300° C. for 2 hours, and the third stage is performed at 600° C. for 2 hours.

The product of the pyrolysis process is ground in a mortar and undergoes treatment with Milli-Q water for a duration of 15 minutes; after the treatment, the liquid phase is removed from the product by means of centrifugation. This process is repeated two or more times. The product obtained undergoes further treatment with oxygenated water with a by-weight concentration of 10% for a duration of 15 minutes. After such treatment, the liquid phase is removed; the solid phase is dried, thereby producing a solid product, labelled "PtNi—$CN_1$ 600/Ni".

It is possible to prepare another product, exactly like the one described above, with the sole difference being that the third step of the pyrolysis process under vacuum is obtained at 900° C. for 2 h. The end product is labelled "CN1 PtNi-900/Ni". PtNi—$CN_1$ 600/Ni is ground in a mortar together with Vulcan XC-72R active carbon with a weight ratio of 4:1, producing a black powder.

Such black powder is used for the preparation of an ink for electrodes for application to a rotating disk electrode (RDE), producing an RDE layer. Such ink is prepared following the procedure described in the article "N. Ramaswamy et al., Adv. Phys. Chem. 2012 (2012), Article #491604". The Pt loading in the RDE layer obtained with the aforesaid ink amounts to 15 µg·cm$^{-2}$.

The aforesaid black powder is also used for the preparation of an ink for electrodes for application to a gas diffusion electrode (GDE). This ink is prepared by suspending the aforesaid black powder in a solution comprising 100 µL of Milli-Q water and 2 mL of isopropyl alcohol; the solution also includes a Nafion® (perfluorinated macromolecule capable of exchanging protons) dispersion rate of 5% by weight.

The resulting ink is homogenized by means of sonication performed with an ultrasound probe and distributed over the GDE; the volatile solvents are removed with an infrared lamp; the result is, therefore, an electrode (GDE) coated with the dried ink. The Pt loading in said electrode amounts to 0.1 mg cm$^{-2}$; the weight ratio between Nafion® and the aforesaid black powder in the electrode is 0.15.

Said RDE, which is coated with the aforesaid RDE layer, is rotated at 1600 rpm and immersed in a 0,1M $HCl_4$ solution thermostated at 25° C. In the conditioning step, pure oxygen is bubbled at a pressure of 1 atm and at a flow rate of 10-40 sccm, preferably 20 sccm, in 0.1 M HClO4 solution for approximately 15 min. Subsequently, the RDE is cycled 25 times from 0.05 to 1.2 V vs. RHE at 100 mV·s$^{-1}$; during such treatment, pure oxygen is bubbled into the solution. At the end of the aforesaid cycle, the solution is removed and then replaced with a fresh 0.1 M $HClO_4$ solution.

The conditioning and cycling steps are repeated, with the sole difference being that nitrogen is bubbled in the 0.1 M $HClO_4$ solution.

The two previous conditioning and cycling steps are repeated a total of three or more times.

The procedure including all the same conditioning and cycling steps as described above is conducted on the GDE coated with the electrode layer.

PtNi—$CN_1$ 900/Ni is used to prepare an RDE layer and a GDE according to the same procedures as described earlier for PtNi—$CN_1$ 600/Ni.

The RDE and GDE layers containing PtNi—$CN_1$ 900/Ni undergo the same conditions and the same cycles as adopted for PtNi—$CN_1$ 600/Ni.

Example 2

Preparation of a Pt-based Electrocatalyst on a Ni Core

A first reagent solution (henceforth denoted "A" here) is obtained by dissolving 555 mg of $K_2PdCl_4$ in the minimum amount of Milli-Q water (approximately 2 mL). and dissolving 640 mg of saccharose in the minimum amount of Milli-Q water (approximately 1 mL); the resulting solution is then added to "A". 2592 mg of 50 nm sized nickel nanoparticles are added to A; the resulting suspension is homogenized by means of sonication with ultrasonic probe.

A second reagent solution (denoted "B") is obtained in exactly the same way as "A", except that $K_2PdCl_4$ is not dissolved. Instead, 585 mg of $K_2Ni(CN)_4$ is dissolved with a degree of hydration of approximately 30%, together with 595 mg of $K_3Co(CN)_6$.

Drop by drop, A is added to B, while B is kept under agitation. The product is agitated for a few seconds; then, the agitation is stopped and the product is left to rest in the air, at room temperature for 48 hours. The water is then removed by means of evaporation into the air at 60° C. for 24 hours. A solid product is thus obtained, which is henceforth denoted "C".

All the subsequent steps for the preparation of the EC are exactly the same as in Example 1. Two products are obtained, denoted "PdCoNi—$CN_1$ 600/Ni" and "PdCoNi—$CN_1$ 900/Ni". The third heat treatment step adopted to obtain PdCoNi—$CN_1$ 600/Ni and PdCoNi—$CN_1$900/Ni has a duration of 2 h and is performed with a dynamic vacuum of $10^{-3}$ bar, at—respectively—600° C. and 900° C. for PdCoNi—$CN_1$ 600/Ni and PdCoNi—$CN_1$ 900/Ni.

Each one of PdCoNi—$CN_1$ 600/Ni and PdCoNi—$CN_1$ 900/Ni is used to obtain an RDE layer and a GDE, in exactly the same way as described earlier in Example 1. The RDE and the GDE undergo the same conditioning and cycling as described in Example 1, with the sole difference being that the cycle is performed at between 0.3 and 0.8 V vs. RHE.

Example 3

Preparation of Pt-based Electrocatalysts on Cu Cores, Adopting Saccharose as a Crosslinker A first reagent solution (denoted "A") is obtained by dissolving 400 mg of $K_2PtCl_4$ in the minimum amount of Milli-Q water (approximately 2 mL) and dissolving 533 mg of saccharose in the minimum amount of Milli-Q water (approximately 1 mL); the resulting solution is then added to "A". 2171 mg of copper nanoparticles, with a particle size of 50 nm, are added to A; the resulting suspension is homogenized by means of sonication with ultrasonic probe.

A second reagent solution (denoted "B") is obtained in exactly the same way as "A", except that $K_2PtCl_4$ is not dissolved. 332 mg of $K_2Ni(CN)_4$ is dissolved with a degree of hydration of approximately 30%.

Drop by drop, "A" is added to "B", which is kept under agitation. The product is kept under agitation for 24 hours. Subsequently, the agitation is stopped and the product is left to rest in the air, at room temperature for 48 hours. The water is then removed by means of evaporation at 60° C. for 24 hours. A solid product is thus obtained, which is denoted "C".

All the subsequent steps for the preparation of the EC are exactly the same as those described in Example 1; the only difference is that they are not carried out with hydrogen peroxide treatments. Thus two products are obtained, which are henceforth denoted "PtNiCN$_1$600/(Cu$_{50}$)" and "PtNi—$CN_1$900/(Cu$_{50}$)". In the third step, the thermal treatment is adopted, which has a duration of two hours and is conducted at 600° C. and 900° C. for, respectively, PtNi—$CN_1$900/(Cu$_{50}$) and PtNi—$CN_1$600/(Cu$_{50}$).

Each one of PtNi—$CN_1$ 600/(Cu$_{50}$) and PtNi—$CN_1$ 900/(Cu$_{50}$) is used to obtain an RDE layer and a GDE, in exactly the same way as described above in Example 1. The RDE layer and the GDE undergo the same conditioning and cycling steps as described in Example 1, with the sole difference being that the cycle is performed at between 0.5 and 0.9 V vs. RHE. Two or more ECs are obtained, exactly as described above for (PtNi—$CN_1$ 600/(Cu$_{50}$) and PtNi—$CN_1$ 900/(Cu$_{50}$). The only difference is that in each reagent solution A and B a further 533 mg of Vulcan XC-72R are added. The results are two electrocatalysts which are denoted "PtNi—$CN_1$600/(Cu$_{50}$+$C_{50}$)" and "PtNi—$CN_1$900/(Cu$_{50}$+$C_{50}$)".

Each one of PtNi—$CN_1$ 600/(Cu$_{50}$+Cu$_{50}$) and PtNi—$CN_1$ 900/(Cu$_{50}$+Cu$_{50}$) is used to obtain an RDE layer and a GDE, in exactly the same way as described above in Example 1. The only difference is that the Vulcan XC-72R is not added. The RDE layer and the GDE undergo the same conditions and the same cycling of steps as described in Example 1, with the sole difference being that the cycle is performed at between 0.5 and 0.9 V vs. RHE.

Example 4

Preparation of a Pt-based Electrocatalyst on a Cu Core, Adopting Polybenzimidazole as a Crosslinker A first reagent solution (denoted "A") is obtained by dissolving 1112 mg of $K_2PtCl_4$ in the minimum amount of Milli-Q water (approximately 4 mL) 25 mL of acetonitrile is added to A and the solution is concentrated to approximately 5 ml on a heating plate. The acetonitrile addition and evaporation process is repeated three times.

A second reagent solution (henceforth denoted "C") is obtained in exactly the same way as "A", except that $K_2PtCl_4$ is not dissolved. 785 mg of $Ni(NO_3)_2H_2O$ is dissolved in the minimum amount of Milli-Q water. 25 mL of acetonitrile is added to C and the solution is concentrated to approximately 5 ml on a heating plate. The acetonitrile addition and evaporation process is repeated three times, as for A.

A third reagent solution (henceforth denoted "B") is obtained by dissolving 7692 mg of commercial paste made from 26% by weight of PBI in 50 mL of dimethylacetamide at T=100° C. 8140 mg of copper nanoparticles, with a particle size of 50 nm, are then added to B; the resulting suspension is homogenized by means of sonication with ultrasonic probe.

Drop by drop, "A" is added to "B", which is kept under agitation. Subsequently, drop by drop, "C" is added to the suspension obtained by blending "A" and "B", which is kept under agitation. The resulting suspension is homogenized vigorously by means of sonication with ultrasonic probe. The product is kept under agitation for 24 hours. Subsequently, the agitation is stopped and the product is left to rest for 48 hours. Finally, the dimethylacetamide is then removed by means of evaporation at 180° C. for 16 hours. A solid product is thus obtained, which is denoted "D".

All the following steps for the preparation of the EC are exactly the same as those described in Example 3; Two products are obtained, and are denoted "PtNi—$CN_h$ 600/(Cu$_{50}$)" and "PtNi—$CN_h$ 900/(Cu$_{50}$)". In the third step, a thermal treatment is adopted to obtain PtNi—$CN_h$ 600/(Cu$_{50}$) and PtNi—$CN_h$ 900/(Cu$_{50}$), which has a duration of two hours and is conducted at 600° C. and 900° C., respectively.

Each one of PtNi—$CN_h$ 600/(Cu$_{50}$) and PtNi—$CN_h$ 900/(Cu$_{50}$) is used to obtain an RDE layer and a GDE, in exactly the same way as described above in Example 1. The RDE layer and the GDE undergo the same conditioning and cycling steps as described in Example 1., with the sole difference being that the cycling is performed at between 0.5 and 0.9 V vs. RHE.

Example 5

Preparation of Sn- and Fe-Based Electrocatalysts without Platinum Group Metals (PGM) with Vulcan XC-72R Nanoparticle Cores, Adopting Saccharose as a Crosslinker A first reagent solution (denoted "A") is obtained by dissolving 864 mg of $Sn(CH_3)_2Cl_2$ in the minimum amount of Milli-Q water (approximately 4 mL) and dissolving 2694 mg of saccharose in the minimum amount of Milli-Q water (approximately 4 mL); the resulting solution is then added to "A". 2753 mg of Vulcan XC-72R is then added to A; the resulting suspension is homogenized by means of sonication with ultrasonic probe.

A second reagent solution (henceforth denoted "B") is obtained in exactly the same way as "A", with the sole difference being that $Sn(CH_3)_2Cl_2$ is not dissolved. 1628 mg of $K_4Fe(CN)_6 \cdot 3H_2O$ is dissolved instead.

Drop by drop, "A" is added to "B", which is kept under agitation. The product is agitated for a few seconds; subsequently, the agitation is stopped and the product is left to rest for 48 hours. The water is then removed by means of evaporation at 60° C. for 24 hours. A solid product is obtained, which is henceforth denoted "C".

C is subjected to a three-stage pyrolysis process under a dynamic vacuum of $10^{-3}$ bar, described as follows: the first step is carried out at 120° C. and has a duration of 8 hours, the second step is carried out at 300° C. and has a duration of 2 hours. the third step is carried out at 900° C. and has a duration of two hours.

The product of the pyrolysis process is ground in a mortar and undergoes treatment with Milli-Q water for a duration of 15 minutes; after the treatment, the liquid phase is removed from the product by means of centrifugation. This process is repeated two or more times. The product of the treatment in Milli-Q water undergoes further treatment with a solution made from 10% by weight of hydrofluoric acid in Milli-Q water for two hours. Then, the product is washed with water, dried in a ventilated stove at 60° C. for 24 hours, and then treated at 900° C. for two hours under a dynamic vacuum of $10^{-3}$ bar. An electrocatalyst is obtained which is denoted $Fe_2Sn-CN_1 9007(C_{50})$.

$Fe_2Sn-CN_1 900/(C_{50})$ is used to prepare an RDE layer, following the same procedure as described above in Example 1, with the sole difference being that the total concentration of the electrocatalyst amounts to 300 μg·cm$^{-2}$. The Vulcan XC-72R is not added to the $Fe_2Sn-CN_1 900/(C_{50})$.

The RDE, coated with the aforesaid layer, is rotated at 1600 rpm and immersed in a 0.1 M $HClO_4$ solution thermostated at 25° C. In one conditioning step, pure oxygen is bubbled at a pressure of 1 atm and at a flow rate of 10-40 sccm, preferably 20 sccm, in 0.1 M $HClO_4$ solution for approximately 15 min. Subsequently, the RDE is cycled 25 times from 0.05 to 1.2 V vs. RHE at 100 mV·s$^{-1}$; during the aforesaid cycling, pure oxygen is bubbled into the solution. At the end of the aforesaid step, the solution is removed and then replaced with a fresh 0.1 M $HClO^4$ solution.

The previous conditioning and cycling steps are repeated, with the sole difference being that nitrogen is bubbled into the 0.1 M $HCl_4$ solution.

The previous oxygen conditioning and cycling steps are repeated.

A further RDE layer is prepared, which is identical to that of the previous description. The RDE, coated with the aforesaid RDE layer, is rotated at 1600 rpm and immersed in a 0.1 M KOH solution thermostated at 25° C. In one conditioning step, pure oxygen is bubbled at a pressure of 1 atm and at a flow rate of 10-40 sccm, preferably 20 sccm, into 0.1 M KOH solution for approximately 15 min. Then, the RDE is cycled 25 times from 0.05 to 1.2 V vs. RHE at 100 mV·sec$^{-1}$; during the aforesaid cycling, pure oxygen is bubbled. At the end of the aforesaid cycling, the solution is removed and then replaced with a fresh 0.1 M KOH solution.

The previous conditioning step is repeated, with the sole difference being that nitrogen is bubbled into the 0.1 M KOH solution.

The previous conditioning step is repeated, with the sole difference being that pure oxygen is bubbled into the 0.1 M KOH solution.

Example 6

Preparation of Fe-Based Electrocatalysts without Platinum Group Metals (PGM) with Vulcan XC-72R Nanoparticle Cores, Adopting Saccharose as a Crosslinker A first reagent solution (denoted "A") is obtained by dissolving 498 mg of $FeCl_3$ in the minimum amount of Milli-Q water (approximately 1 mL) and dissolving 1805 mg of saccharose in the minimum amount of Milli-Q water (approximately 2 mL); the resulting solution is then added to A. 1862 mg of Vulcan XC-72R is added to A; the resulting suspension is homogenized by means of sonication with ultrasonic probe.

A second reagent solution (henceforth denoted "B") is obtained in exactly the same way as "A", except that $FeCl_3$ is not dissolved. 2525 mg of $K_4Fe(CN)_6 \cdot 3H_2O$ is dissolved instead.

The following steps for the preparation of the sample, the RDE layer and the GDE layer are exactly the same as those described earlier in Example 5. The sample is labelled "$FeFe_2-CN_1 9001(C_{50})$".

Example 7 (Comparative)

The RDE and GDE layers described in Examples 1-6 are characterized by determining the performance thereof in the oxygen reduction reaction (ORR), as follows.

Each RDE layer, which is deposited on a RDE, is immersed in a suitable electrolyte, which is thermostated at 25° C. The RDE is rotated at 1600 rpm and cycled at 20 mV·s$^{-1}$ with 1 bar of pure oxygen, which is bubbled through the electrolyte. The cycling proceeds until the voltammogram becomes stable; then a scan is recorded with increasing potential. The ohmic correction is performed according to the procedure described in the following reference: D. van der Vliet et al., J. Electroanal. Chem. 647 (2010) 29-34.

Said procedure is then repeated on said RDE layer, with the sole difference being that the measurement is carried out with 1 bar of pure nitrogen.

The current attributable to the ORR is obtained by subtracting the data obtained with 1 bar of nitrogen from the data obtained with 1 bar of pure oxygen, as described in the following reference: Jia X. Wang et al., Faraday Discuss. 140 (2008) 347-362.

The ORR kinetic current is obtained from the current attributable to the ORR as described in the following reference: "T. J. Schmidt, H. A. Gasteiger, Handbook of Fuel Cells—Fundamentals, Technology and Applications (Eds:

W. Vielstich, A. Lamm, H. A. Gasteiger), Vol. 2, John Wiley, Hoboken, NJ 2003, pp. 316-333".

The RDE layers obtained as described in Examples 1-6 are characterized in an acidic environment, using a 0.1 M $HClO_4$ solution as the electrolyte. In this case, the cycling is conducted from 0.05 to 1.1 V.

The RDE layers obtained as described in Examples 5-6 are characterized in an alkaline environment, using a 0.1 M KOH solution as the electrolyte. In this case, the cycle is performed from −0.95 to 0.11 V vs. Hg/HgO.

The performance of the RDE layers including PGM (Examples 1-4) in the ORR in an acidic environment is measured by comparing the kinetic current determined at 0.9 V vs. RHE, on the basis of the following reference: H. A. Gasteiger et al., Appl.Catal. B-Environ. 56 (2005) 9-35.

In all other cases, the ORR performance is assessed by comparing the electrode potential to the 100 µA ORR kinetic current.

The comparison of the ORR representation of the RDE layers is obtained as described in Examples 1-4 shown in Table 1.

TABLE 1

ORR performance of the RDE layers obtained as described in Examples 1-4.

| $EC^{[1]}$ group | EC included in the RDE layer | Mass activity at 0.9 V vs. RHE/ $A \cdot mg_{Pt, Pd}^{-1}$ |
|---|---|---|
| Generation 1 | PtNi600 | 0.006 |
|  | PtFe900 | 0.020 |
| Generation 2 | PdCoNi—$CN_l$ 900/G | 0.029 |
|  | PdCoNi—$CN_h$ 900/G | 0.047 |
|  | PtNi—$CN_l$ 600/G | 0.184 |
|  | PtNi—$CN_l$ 900/G | 0.243 |
|  | $PtFe_2$—$CN_l$ 600/G | 0.048 |
|  | $PtFe_2$—$CN_l$ 900/G | 0.038 |
| Generation 3 | PtNi—$CN_l$ 600/Ni | 0.290 |
|  | PtNi—$CN_l$ 900/Ni | 0.398 |
|  | PdCoNi—$CN_l$ 600/Ni | 0.017 |
|  | PdCoNi—$CN_l$ 900/Ni | 0.138 |
|  | PtNi—$CN_l$ 600/($Cu_{50}$) | 0.291 |
|  | PtNi—$CN_l$ 900/($Cu_{50}$) | 0.669 |
|  | PtNi—$CN_l$ 600/($Cu_{50}$ + $C_{50}$) | 0.703 |
|  | PtNi—$CN_l$ 900/($Cu_{50}$ + $C_{50}$) | 0.850 |
|  | PtNi—$CN_h$ 600/($Cu_{50}$) | 0.105 |
|  | PtNi—$CN_h$ 900/($Cu_{50}$) | 0.719 |
|  | Pt/C ref. | 0.141 |

[1]Generation 1 ECs: prepared according to patent U.S. Pat. No. 8,691,716; Generation 2 ECs: described in WO2009157033; Generation 3 ECs: ECs stated in Examples 1-4 of the present document. The comparison of the ORR performance of the RDE layers obtained as described in Examples 5-6 is shown in Table 2.

TABLE 2

ORR performance of the RDE layers obtained as described in Examples 5-6.

| EC included in the RDE layer | Electrolyte | Electrode potential measured at $i_{k, ORR}$ = 100 µA |
|---|---|---|
| $Fe_2Sn$—$CN_l$ 900 ($C_{50}$) | 0.1M $HClO_4$ | 0.630 V vs. RHE |
| $FeFe_2$—$CN_l$ 900 ($C_{50}$) |  | 0.532 V vs. RHE |
| Pt/C ref. |  | 0.943 V vs. RHE |
| $Fe_2Sn$—$CN_l$ 900 ($C_{50}$) | 0.1M KOH | −0.204 V vs. Hg/HgO |
| $FeFe_2$—$CN_l$ 900 ($C_{50}$) |  | −0.179 V vs. Hg/HgO |
| Pt/C ref. |  | −0.105 V vs. Hg/HgO |

Each GDE coated with an electrode layer including PGM (Examples 1-4) is used to produce a membrane electrode assembly (MEA).

Each MEA includes the following components:

(1) an anode electrode, comprising multi-ply carbon paper coated with a carbon electrode layer including the commercially available ECs of reference, denoted as Pt/C, constituted of 20% by weight of Pt and Nation®. The Pt concentration is 0.4 mg $cm^{-2}$ and the Nafion/C weight ratio is 0.6;

(2) a Nafion117™ proton conducting membrane (characterized by a thickness of approximately 180 µm; such membrane consists of a perfluorinated macromolecule capable of exchanging protons), treated as described in the following article: V. Di Noto et al., J. Power Sources 178 (2008) 561-574;

(3) the GDEs obtained as described in Examples 1-4. An additional GDE was prepared, coated with a layer electrode comprising: (a) a commercially available Pt/C EC of reference with 10& by weight Pt dispersed on Vulcan XC-72R, in a weight ratio of 1:1; (b) the Nafion® ionomer; the Pt concentration is 0.1 mg·$cm^{-2}$ and the Nafion/C weight ratio is 0.6.

The components (1)-(3) are joined together by hot pressing.

Each MEA is tested under operational conditions, as follows. $H_2$ flow rate at anode: 800 sccm; $O_2$ flow rate at anode: 500 sccm; reagent gas flow temperature: 85° C.; the relative humidity of both of the reagent gas flows is 100%; the reagent flow pressure is 65 prig; the cell temperature amounts to 85° C.

The performance of the MEAs bearing the GDEs obtained as described in Examples 1-4 is assessed based on the quantity of PGMs present at the cathode needed to obtain 1 kW of electric power. For each MEA, Table 3 shows both the minimum value and that determined with a cell potential of 0.7 V.

TABLE 3

Performance of the MEAs bearing GDEs obtained as described in Examples 1-4

| Group of electrocatalysts $^{[1]}$ | EC included in the GDE | Minimum PGM mass (g) needed to obtain 1 kW | PGM mass (g) needed to obtain 1 kW with a cell potential of 0.7 V |
|---|---|---|---|
| Generation No1 | PtNi600 | 0.89 | 1.27 |
|  | PtFe900 | 1.00 | 1.40 |
| Generation No2 | PdCoNi—$CN_l$ 900/G | 0.46 | 1.26 |
|  | PdCoNi—$CN_h$ 900/G | 0.90 | 3.85 |
|  | PtNi—$CN_l$ 600/G | 0.30 | 0.50 |
|  | PtNi—$CN_l$ 900/G | 0.31 | 0.49 |
|  | $PtFe_2$—$CN_l$ 600/G | 0.32 | 0.51 |
|  | $PtFe_2$—$CN_l$ 900/G | 0.40 | 0.64 |
| Generation No3 | PtNi—$CN_l$ 600/Ni | 0.43 | 0.77 |
|  | PtNi—$CN_l$ 900/Ni | 0.50 | 0.84 |
|  | PdCoNi—$CN_l$ 600/Ni | 0.80 | 5.88 |
|  | PdCoNi—$CN_l$ 900/Ni | 0.48 | 2.41 |
|  | PtNi—$CN_l$ 600/($Cu_{50}$) | 0.40 | 0.64 |
|  | PtNi—$CN_l$ 900/($Cu_{50}$) | 0.35 | 0.52 |
|  | PtNi—$CN_l$ 600/($Cu_{50}$ + $C_{50}$) | 0.26 | 0.38 |
|  | PtNi—$CN_l$ 900/($Cu_{50}$ + $C_{50}$) | 0.29 | 0.45 |
|  | PtNi—$CN_h$ 600/($Cu_{50}$) | 0.35 | 0.50 |
|  | PtNi—$CN_h$ 900/($Cu_{50}$) | 0.37 | 0.54 |
|  | Pt/C ref. | 0.43 | 1.38 |

[1] ECs denoted "Generation 1": prepared according to patent l'U.S. Pat. No. 8,691,716; "Generation 2": prepared as described in WO2009157033; "Generation 3": ECs stated in Examples 1-4 of the present document.

Although, at the moment, it is felt that the ECs and the electrode configurations described here are the preferred aspects of the present invention, those skilled in the art will realize which other and further aspects may be achieved without straying too far from the spirit of the invention. All of these further modifications and changes are included in the scope of the claims set out below.

The invention claimed is:

1. A method for making an electrocatalyst which comprises the steps of (i) preparing a precursor, (ii) adsorbing the precursor on a surface of conducting support particles to obtain a core-shell system, wherein said conducting support particles are one or more metallic elements; (iii) applying a thermal treatment to the thus-obtained core-shell system to obtain a core-shell electrocatalyst and (iv) activating the thus-obtained core-shell electrocatalyst, characterized in that said core-shell electrocatalyst is activated electrochemically, wherein said electrochemical activation is achieved by applying an electrochemical potential characterized in that at least one cycle of increasing and decreasing electrochemical potential is applied, and wherein said electrochemical potential increases linearly from values comprised between minimum −1 to maximum 2 V vs. RHE and decreases linearly from values comprised between maximum 2 to minimum −1 V vs. RHE, wherein the electrochemical potential is selected based on the one or more metallic elements of the conducting support particles so as to increase electrochemical performance of the core-shell electrocatalyst.

2. The method according to claim 1, wherein the at least one cycle comprises from 10 to 100 cycles.

3. The method according to claim 2, characterized in that said electrochemical potential is applied at a temperature from 10 to 90° C.

4. The method according to claim 1, wherein said core-shell electrocatalyst is also activated thermally, characterized in that said thermal activation includes first treating the core-shell electrocatalyst with a polar liquid; and subsequently drying and then heating the core-shell electrocatalyst to a temperature from 400 to 1000° C.

5. The method according to claim 4, characterized in that said polar liquid contains:
   (a) water as solvent;
   (b) at least one inorganic and/or organic acid; or at least one inorganic and/or organic base; and
   (c) at least a reducing agent; or at least an oxidizing agent.

6. The method according to claim 1, characterized in that the precursor is prepared through a sol-gel reaction comprising: generating a solution A, wherein solution A comprises water, an organic crosslinker and at least one complex containing a transition metal coordinated by good leaving groups; generating a solution B, wherein solution B comprises water, at least one cyanometallate, thiocyanometallate or isocyanometallate and optionally an organic crosslinker; and mixing solution A and solution B.

7. The method according to claim 1, characterized in that the precursor is prepared through a sol-gel reaction comprising: generating a solution A, wherein solution A comprises water, a polar organic solvent and at least one complex containing a transition metal coordinated by at least a good leaving group; generating a solution B, wherein solution B comprises a polar organic solvent and an organic crosslinker bearing functional groups containing nitrogen; generating a solution C wherein solution C comprises water, a polar organic solvent and at least one cyanometallate, thiocyanometallate or isocyanometallate; mixing solution A and solution B and then mixing the thus obtained solution with solution C.

8. The method according to claim 6, characterized in that said complex is selected from $HAuCl_4$, $H_2IrCl_6$, $H_2PtCl_6$, $Li_2PdCl_4$, $(NH_4)_2IrCl_6$, $(NH_4)_2OsCl_6$, $(NH_4)_2PdCl_4$, $(NH_4)_2PdCl_6$, $(NH_4)_2PtCl_4$, $(NH_4)_2PtCl_6$, $(NH_4)_3RhCl_6$, $(NH_4)_2RuCl_6$, $KAuCl_4$, $KPt(NH_3)Cl_3$, $K_2PdCl_4$, $K_2PtCl_4$, $K_2PdCl_6$, $K_2PtCl_6$, $K_2ReCl_6$, $K_2RhCl_6$, $K_2H_2IrCl_6$, $K_2H_2OsCl_6$, $K_3IrCl_6$, $K_3H_3RuCl_6$, $Na_2IrCl_6$, $NaOsCl_6$, $Na_2PdCl_4$, $Na_2PtCl_6$, $Na_3RhCl_6$, $CrCl_3$, $IrCl_3$, $FeCl_3$, $NiCl_2$, $OsCl_3$, $PdCl_2$, $PtCl_2$, $PtCl_4$, $RhCl_3$, $RuCl_3$, $ReCl_5$, $SnCl_4$, $VCl_3$, $VCl_4$, $WCl_4$, $WCl_6$ and $ZrCl_4$.

9. The method according to claim 6, characterized in that said cyanometallate is selected from $KAg(CN)_2$, $KAu(CN)_2$, $K_2Ni(CN)_4$, $K_2Pd(CN)_4$, $K_2Pt(CN)_4$, $K_3Co(CN)_6$, $K_3Cr(CN)_6$, $K_3Fe(CN)_6$, $K_3Mn(CN)_6$, $K_2Pt(CN)_6$ and $K_4Ru(CN)_6$.

10. The method according to claim 6, characterized in that said organic crosslinker is selected from monosaccharides; disaccharides; polyethylene glycol, polyvinyl alcohol or a mixture of polyethylene glycol and polyvinyl alcohol; or a mixture thereof.

11. The method according to claim 7, characterized in that said polar organic solvent of solution A, solution B, or solution C is selected from acetonitrile, N-methylpyrrolidone, dimethylformamide, dimethylacetamide or a mixture thereof.

12. The method according to claim 7, characterized in that said organic crosslinker is selected from polyacrylonitrile, polybenzimidazole or a mixture thereof.

13. The method according to claim 1, characterized in that said metallic elements are selected from gold, copper, nickel, zinc or an alloy thereof.

14. The method according to claim 1, characterized in that said conducting support particles have a size ranging from 3 to 50 nm and are shaped as nanoparticles, nanosheets or nanowires.

15. The method according to claim 1, characterized in that thermal treatment (iii) comprises a first step at a temperature from 50 to 450° C. and at least a second step at a temperature from 300 to 1250° C.

16. The method according to claim 15, characterized in that said first step lasts from 2 to 24 hours and said second step lasts from 2 to 8 hours.

17. The method according to claim 4, characterized in that the heating is carried out in an inert atmosphere or under vacuum.

18. The method according to claim 17, characterized in that said inert atmosphere is an atmosphere of helium, argon, nitrogen, carbon dioxide or a mixture thereof.

19. The method according to claim 7, characterized in that said complex is selected from $HAuCl_4$, $H_2IrCl_6$, $H_2PtCl_6$, $Li_2PdCl_4$, $(NH_4)_2IrCl_6$, $(NH_4)_2OsCl_6$, $(NH_4)_2PdCl_4$, $(NH_4)_2PdCl_6$, $(NH_4)_2PtCl_4$, $(NH_4)_2PtCl_6$, $(NH_4)_3RhCl_6$, $(NH_4)_2RuCl_6$, $KAuCl_4$, $KPt(NH_3)Cl_3$, $K_2PdCl_4$, $K_2PtCl_4$, $K_2PdCl_6$, $K_2PtCl_6$, $K_2ReCl_6$, $K_2RhCl_6$, $K_2H_2IrCl_6$, $K_2H_2OsCl_6$, $K_3IrCl_6$, $K_3H_3RuCl_6$, $Na_2IrCl_6$, $NaOsCl_6$, $Na_2PdCl_4$, $Na_2PtCl_6$, $Na_3RhCl_6$, $CrCl_3$, $IrCl_3$, $FeCl_3$, $NiCl_2$, $OsCl_3$, $PdCl_2$, $PtCl_2$, $PtCl_4$, $RhCl_3$, $RuCl_3$, $ReCl_5$, $SnCl_4$, $VCl_3$, $VCl_4$, $WCl_4$, $WCl_6$ and $ZrCl_4$.

20. The method according to claim 7, characterized in that said cyanometallate is selected from $KAg(CN)_2$, $KAu(CN)_2$, $K_2Ni(CN)_4$, $K_2Pd(CN)_4$, $K_2Pt(CN)_4$, $K_3Co(CN)_6$, $K_3Cr(CN)_6$, $K_3Fe(CN)_6$, $K_3Mn(CN)_6$, $K_2Pt(CN)_6$ and $K_4Ru(CN)_6$.

21. The method according to claim 1, characterized in that said conducting support particles further comprise carbon or graphene.

22. The method according to claim 1, wherein the conducting support particles comprise copper, wherein the minimum electrochemical potential applied during the electrochemical activation is 0.5 V vs. RHE, and wherein the maximum electrochemical potential applied during the electrochemical activation is 0.9 V vs. RHE.

23. A method for making an electrocatalyst which comprises the steps of (i) preparing a precursor, (ii) adsorbing the precursor on a surface of conducting support particles to obtain a core-shell system, wherein said conducting support particles are one or more metallic elements; (iii) applying a thermal treatment to the thus-obtained core-shell system to obtain a core-shell electrocatalyst and (iv) activating the thus-obtained core-shell electrocatalyst, characterized in that said core-shell electrocatalyst is activated electrochemically, wherein said electrochemical activation is achieved by applying an electrochemical potential characterized in that at least one cycle of increasing and decreasing electrochemical potential is applied, and wherein said electrochemical potential increases linearly from values comprised between minimum −1 to maximum 2 V vs. RHE and decreases linearly from values comprised between maximum 2 to minimum −1 V vs. RHE, wherein the electrochemical potential is selected based on the core-shell electrocatalyst comprising palladium so as to increase electrochemical performance of the core-shell electrocatalyst.

24. The method of claim 23 wherein the maximum electrochemical potential applied during the electrochemical activation is 0.8 V vs. RHE.

\* \* \* \* \*